US010968137B1

(12) United States Patent
Guynn

(10) Patent No.: US 10,968,137 B1
(45) Date of Patent: Apr. 6, 2021

(54) PROCESS FOR BENEFICIATING FLY ASH, BENEFICIATED FLY ASH, AND CEMENTITIOUS COMPOSITIONS CONTAINING BENEFICIATED FLY ASH

(71) Applicant: ROMAN CEMENT, LLC, Salt Lake City, UT (US)

(72) Inventor: John M. Guynn, Salt Lake City, UT (US)

(73) Assignee: ROMAN CEMENT, LLC, Salt Lake City, UT (US)

( * ) Notice: Subject to any disclaimer, the term of this patent is extended or adjusted under 35 U.S.C. 154(b) by 440 days.

(21) Appl. No.: 15/967,227

(22) Filed: Apr. 30, 2018

Related U.S. Application Data

(60) Provisional application No. 62/492,287, filed on Apr. 30, 2017.

(51) Int. Cl.
| | | |
|---|---|---|
| C04B 7/26 | (2006.01) |
| C04B 28/04 | (2006.01) |
| B07B 11/00 | (2006.01) |
| B07B 4/00 | (2006.01) |
| B07B 7/00 | (2006.01) |

(52) U.S. Cl.
CPC .............. C04B 7/26 (2013.01); C04B 28/04 (2013.01); B07B 4/00 (2013.01); B07B 7/00 (2013.01); B07B 11/00 (2013.01)

(58) Field of Classification Search
CPC .. B07B 4/00; B07B 7/00; B07B 11/00; C04B 7/26; C04B 28/04
See application file for complete search history.

(56) References Cited

U.S. PATENT DOCUMENTS

| 5,992,336 | A | * | 11/1999 | Ramme | ...................... | F23C 1/00 |
|---|---|---|---|---|---|---|
| | | | | | | 106/DIG. 1 |
| 8,074,804 | B2 | * | 12/2011 | Ramme | ................. | C04B 18/082 |
| | | | | | | 209/133 |
| 9,067,824 | B1 | * | 6/2015 | Hansen | ............... | C04B 40/0039 |
| 2010/0089293 | A1 | * | 4/2010 | Guynn | ..................... | C04B 28/18 |
| | | | | | | 106/709 |
| 2014/0224154 | A1 | * | 8/2014 | Guynn | ...................... | C04B 7/02 |
| | | | | | | 106/638 |
| 2014/0299023 | A1 | * | 10/2014 | Guynn | .................... | C04B 28/02 |
| | | | | | | 106/709 |

\* cited by examiner

Primary Examiner — Charles A Fox
Assistant Examiner — Kalyanavenkateshware Kumar
(74) Attorney, Agent, or Firm — Workman Nydegger

(57) ABSTRACT

A non-conforming fly ash is converted into conforming fly ash by: (1) obtaining an initial fly ash with at least one non-conforming characteristic selected from excess carbon or low reactivity index as defined by ASTM C-618 and having a D10, D50 and D90; (2) classifying the initial fly ash using one or more air classifiers to produce at least two separate fly ash streams, including fine fly ash and coarse fly ash; and (3) collecting the fine fly ash and the coarse fly ash, (4) the fine fly ash having a D90 approximately equal to or less than the D50 of the initial fly ash and a conforming carbon content and a conforming reactivity index as defined by ASTM C-618.

20 Claims, 14 Drawing Sheets

PROCESS FOR BENEFICIATING FLY ASH, BENEFICIATED FLY ASH, AND CEMENTITIOUS COMPOSITIONS CONTAINING BENEFICIATED FLY ASH

CROSS-REFERENCE TO RELATED APPLICATION

This application claims the benefit of U.S. Provisional Patent Application No. 62/492,287, filing Apr. 30, 2017, the disclosure of which is incorporated herein by reference in its entirety.

BACKGROUND OF THE INVENTION

1. Field of the Invention

The invention is generally in the field of fly ash beneficiation.

2. Relevant Technology

Fly ash, also known as "pulverized coal ash", is a coal combustion product comprising fine particles driven out of the boiler with flue gases. In modern coal-fired power plants, fly ash is generally captured by electrostatic precipitators or other particle filtration equipment before the flue gases reach the chimneys. Depending upon the source and makeup of the coal being burned, the components of fly ash vary considerably, but all fly ash includes substantial amounts of silicon dioxide ($SiO_2$) (both amorphous and crystalline), aluminum oxide ($Al_2O_3$) and calcium oxide (CaO), the main mineral compounds in coal-bearing rock strata.

Fly ash is a supplementary cementitious material (SCM), along with others such as metallurgical slags, natural pozzolans, and biomass ash, which can be used to replace a portion of Portland cement in concrete. SCMs can yield improved concrete with increased paste density, higher durability, lower heat of hydration, lower chloride permeability, reduced creep, increased resistance to chemical attack, lower cost, and reduced environmental impact. Pozzolans react with calcium hydroxide released during cement hydration. Some SCMs have self-cementing properties, an example of which ground granulated blast furnace slag (GGBFS).

Not all fly ashes meet ASTM or EN requirements for use as a partial replacement for Portland cement in concrete. Fly ash used as a cement replacement must meet established standards. In the U.S., ASTM C-618 mandates that a maximum of 34% of the fly ash can be retained by a 325 mesh (45 μm) sieve, that maximum carbon content measured by loss on ignition (LOI) is 6.0%, and the reactivity index must be at least 75. Failure to meet all of these criteria means the fly ash is out of specification. Europe and other jurisdictions have similar requirements for maximum carbon content (or LOI), maximum amount of fly ash retained by a 325 mesh (45 μm) sieve, and minimum reactivity index.

BRIEF SUMMARY OF DISCLOSED EMBODIMENTS

Disclosed herein are methods and systems for beneficiating fly ash having high carbon content and/or low reactivity to yield fly ash having lower carbon content and higher reactivity. In this way fly ash that includes at least one non-conforming (or barely conforming) characteristic such as high carbon content and/or low reactivity index, can be beneficiated in order to conform to applicable specifications and be usable in concrete.

In some embodiments, a method of converting a non-conforming fly ash into conforming fly ash, comprises: (1) obtaining an initial fly ash with at least one non-conforming characteristic selected from excess carbon or low reactivity index as defined by ASTM C-618 and having a D10, D50 and D90; (2) classifying the initial fly ash using one or more air classifiers to produce at least two separate fly ash streams, including fine fly ash and coarse fly ash; and (3) collecting the fine fly ash and the coarse fly ash, (4) the fine fly ash having a D90 approximately equal to or less than the D50 of the initial fly ash and a conforming carbon content and a conforming reactivity index as defined by ASTM C-618.

In some embodiments, the initial fly ash has a reactivity index as defined by ASTM C-618 of less than 75, less than 70, less than 65, less than 60, less than 55, or less than 50. In addition, or alternatively, the initial fly ash having a carbon content greater than 4.5%, greater than 5%, greater than 5.5%, greater than 6%, greater than 6.5%, greater than 7% or greater than 7.5%.

In general, the initial fly ash can have: (1) a D90 greater than 40 μm, greater than 50 μm, greater than 60 μm, greater than 70 μm, greater than 80 μm, greater than 90 μm, greater than 100 μm, or greater than 120 μm; (2) a D50 in a range of 12 μm to 40 μm, or 14 μm to 36 μm, or 16 μm to 32 μm, or 18 μm to 30 μm, or 20 μm to 28 μm; and (3) a D10 less than 8 μm, less than 7 μm, less than 6 μm, less than 5 μm, less than 4 μm, or less than 3 μm.

In some embodiments, the fine fly ash having a D90 less than 25 μm, less than 22.5 μm, less than 20 μm, less than 17.5 μm, less than 15 μm, less than 12.5 μm, less than 11 μm, less than 10 μm, less than 9 μm, less than 8 μm, less than 7 μm, less than 6 μm, or less than 5 μm. The fine fly ash can have a reactivity index as defined by ASTM C-618 of at least 75, at least 80, at least 85, at least 90, at least 95, at least 100, at least 105, at least 110, at least 115, or at least 120. The fine fly ash can have a carbon content of less than 6%, less than 5.5%, less than 5%, less than 4.5%, less than 4%, less than 3.5%, less than 3%, or less than 2.5%.

In some embodiments, the fine fly ash can be blended with hydraulic cement to form a dry cementitious binder blend. In addition, or alternatively, the fine fly ash can be blended with hydraulic cement and water to form a cementitious mixture. In some embodiments, one or more aggregates can be added, such as a fine aggregate (sand) and coarse aggregate (coarse sand, pea gravel and/or rock).

In some cases, the fine fly ash can cause a sulfate deficiency by virtue of contributing aluminates, aluminoferrites, or other aluminum and/or iron oxide materials that consume sulfate ions. In some embodiments, it may be desirable to add a sulfate source to compensate for a sulfate deficiency. Examples of sulfate sources include, for example, alkali metal and alkaline earth metal sulfates.

In some cases, the fine fly ash can cause rapid depletion of calcium hydroxide, causing a reduction in solution pH below a desired level. In some embodiments, it may be desirable to add supplemental lime to compensate for a depletion of calcium hydroxide. Examples include quicklime (CaO) and hydrated lime ($Ca(OH)_2$).

In some cases, the fine fly ash can cause rapid depletion of calcium ions in the solution below a desired level. This can cause set retardation and, in some cases, delay in strength development. In some embodiments, it may be desirable to add a source of calcium ions to compensate for a depletion of calcium ions. Examples of calcium ion sources include soluble calcium salts, such as calcium nitrate, calcium nitrite, calcium urea nitrate, calcium halides, calcium sulfite, calcium thiosulfate, calcium phosphates, quicklime (CaO), hydrated lime (Ca(OH)$_2$) and the like.

In some cases, it may be desirable to blend fine fly ash with hydraulic cement and a different supplementary cementitious material (SCM), such as ground granulated blast furnace slag (GGBFS), calcined shale, natural pozzolan, ground limestone, and the like. An inert filler, such as ground limestone, rock dust or quarry fines, can be used to provide an overall cementitious binder blend having a broader particle size distribution, higher particle packing, and greater strength and durability.

In some embodiments, even the coarse fly ash "waste" can be used beneficially as a low reactive mineral filler. To enhance reactivity of the overall binder blend, a fine cement (e.g., D90<25 µm) can be blended with coarse fly ash produced as a byproduct to form a binary blend having an overall PSD broader than either the fine cement or coarse fly ash individually. In some embodiments, a portion of the coarse fly ash can be characterized as forming part of the cementitious binder (e.g., for purposes of determining the water to cementitious binder ratio (w/cm), which can be useful when designing concrete having a desired strength and/or slump) and another portion can be characterized as forming part of the aggregate.

In other embodiments, a narrow PSD cement (e.g., D90<30 µm and D10>1.5 µm) can be blended with ultrafine SCM (e.g., D90<10 µm) and a coarse SCM (e.g., D10>15 µm and D90>50 µm) to form a ternary blend having an overall PSD broader than either the narrow PSD cement, ultrafine fly ash, or coarse fly ash individually. Because binary and ternary blends made in this manner can have greater early strength, durability, and other beneficial properties compared to traditional blends of OPC and fly ash, dividing the cement and/or fly ash into multiple blending fractions of different PSD and the blending them so that the cement and fly ash fractions complement each other can yield two or more blended cement compositions having superior properties than traditional blended cements. The ratios of the different particulate blending materials can be altered to yield blends having a wide variety of cement substitution levels, strengths, durabilities, and the like.

In some embodiments, an ultrafine fly ash made by classifying an initial fly ash can be used as a micro silica material to yield concrete having high durability, low permeability, high paste density, and high strength. In some embodiments, a middle fly ash fraction made by removing the ultrafine and coarse fly ash particles can be used as a traditional fly ash of the same type, while the ultrafine fly ash fraction can be used as a high end SCM to make high strength cement-SCM blends and concrete, and the coarse fly ash fraction can be blended with a finer cement to make a binary blend that performs the same or better than OPC.

In some embodiments, fine fly ash materials of different fineness for different purposes are made by classifying a source fly ash at a first D90 to yield fine and coarse fly ash fractions, followed by classifying a source fly ash at a second D90 to yield a different fine fly ash fraction. For example, when making an ultrafine fly ash (UFFA), such as for use as micro silica and/or silica fume substitute, the D90 can be set at less than about 12 µm, 11 µm, 10 µm, 9 µm, 8 µm, 7 µm, 6 µm, or 5 µm. Thereafter, when making a less fine fly that is more reactive than the source fly ash but less reactive than UFFA (e.g., to increase yield), the D90 can be set at about 10 µm, 11 µm, or 12 µm or above and less than about 60 µm, 50 µm, 45 µm, 40 µm, 35 µm, 30 µm, 25 µm, 20 µm, 17.5 µm, 15 µm, or 13 µm.

In some embodiments, a system for beneficiating fly ash comprises: (1) one or more air classifiers, and optionally one or more grinding mills, configured to process an initial fly ash having an initial particle size distribution (PSD) (e.g., an initial D10 and an initial D90) and yield a plurality of fly ash fractions.

These and other advantages and features of the invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Introduction

Figure 1A:
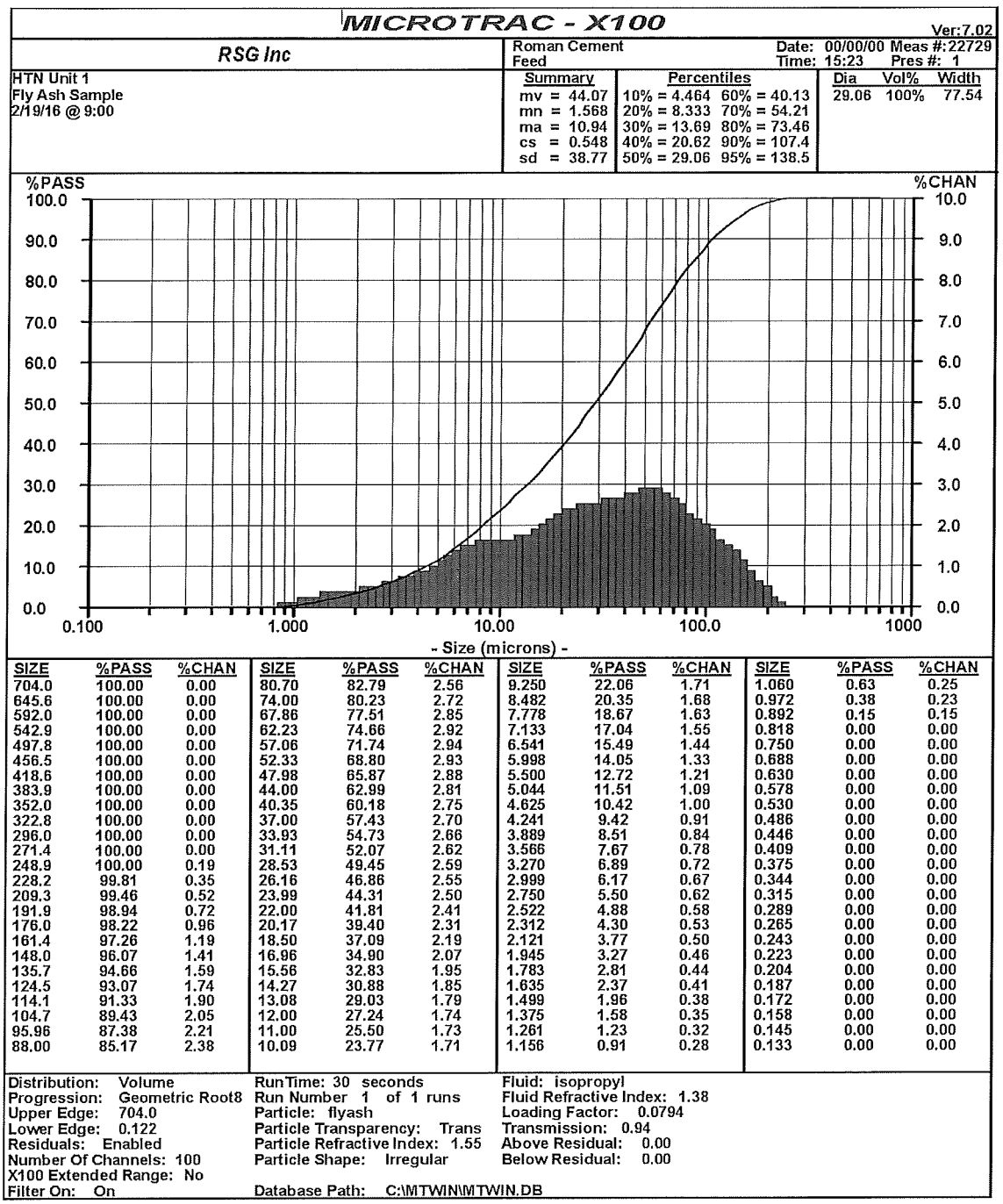
FIGS. 1A-1C are graphs illustrating the particle size distributions (PSDs) of various fly ash materials produced by various power plants.

Disclosed herein are methods and systems for beneficiating fly ash having high carbon content and/or low reactivity to yield fly ash having lower carbon content and higher reactivity. In this way fly ash that includes at least one non-conforming (or barely conforming) characteristic such as high carbon content and/or low reactivity index, can be beneficiated in order to conform to applicable specifications and be usable in concrete.

In addition, a fly ash beneficiated by classification to increase reactivity index and/or reduce LOI can be further modified by blending with a source of aluminosilicates, such as a natural pozzolan, in order to increase the silica and alumina contents. In some cases, a beneficiated fly ash that has a combined silica, alumina and ferric oxide content (SAF) of less than 70% can be modified by blending with a source of aluminosilicates so that the resulting blended pozzolan has an SAF of at least 70%.

Examples of cement fractions, SCM fractions, binary, ternary and quaternary cement-SCM blends and compositions that can utilize fine and coarse fly ash fractions made using the methods and systems disclosed herein are found in U.S. Pat. Nos. 7,799,128, 7,972,432, 8,323,399, 8,974,593, 9,067,824, 8,414,700, 8,377,201, 8,551,245 and 9,102,567, the disclosures of which are incorporated herein in their entirety.

The terms "hydraulic cement" and "cement" shall include Portland cement, cements defined by ASTM C150 (Types I-V) and similar materials that contain one or more of the four clinker minerals: $C_3S$ (tricalcium silicate), $C_2S$ (dicalcium silicate), $C_3A$ (tricalcium aluminate), and $C_4AF$ (tetracalcium aluminoferrite). Other examples of hydraulic cement include white cement, calcium aluminate cement, high-alumina cement, magnesium silicate cement, magnesium oxychloride cement, oil well cements (e.g., Type VI, VII and VIII), magnesite cements, and combinations of these. Ground granulated blast-furnace slag (GGBFS) and other slags that include one or more clinker minerals may also function as hydraulic cement. They also qualify as SCMs. Some highly reactive class C fly ashes have self-cementing properties and can qualify as "hydraulic cement".

Consistent with defining GGBFS, slags and reactive fly ashes as "hydraulic cement", alkali-activated cements, sometimes known as "geopolymer cements", are also examples of "hydraulic cements". It will be appreciated that when geopolymer cements or other highly reactive pozzolans are used, two or more separately graded pozzolan fractions may be combined together.

The terms "Supplementary Cementitious Material" and "SCM" shall include materials commonly used in the industry as partial replacements for Portland cement in concrete, mortar and other cementitious materials, either in blended cements or by self-blending in the end user. Examples range from highly reactive materials (e.g., GGBFS), moderately reactive materials (e.g., Class C fly ash, steel slag, silica fume, activated metakaolin, metastable forms of $CaCO_3$), lower reactive materials (e.g., Class F fly ash, volcanic ash, natural pozzolans, trass, and metastable forms of $CaCO_3$), and essentially non-reactive materials and fillers (e.g., ground limestone, ground quartz, precipitated $CaCO_3$, precipitated $MgCO_3$). Through alkali activation, it is possible for some SCMs to also become hydraulically reactive. In a sense, the pozzolanic reaction is a form of alkali activation, albeit by less basic and/or soluble calcium ions as compared to more basic and/or soluble sodium or potassium ions as in typical geopolymer cements.

The PSD of particulate materials, including hydraulic cement, fly ash, and other SCMs, can be defined by their D10, D50 and D90, with the D10 approximating the lower PSD endpoint ("LEP"), the D90 approximating the upper PSD endpoint ("UEP"), and the D50 approximating the mean particle size ("MPS") of the PSD. In other embodiments, the D1, D5, D15, or intermediate value can be used as the approximate LEP, the D85, D95, D99, or intermediate value as the approximate UEP, and the D40, D45, D55, d60 or intermediate value as the approximate MPS.

To ensure the particulate material has a PSD within desired parameters, care should be taken to accurately determine particle size distribution. The particle size of perfectly spherical particles can be measured by diameter. Fly ash is generally spherical owing to how it is formed, but typically becomes non-spherical when ground to reduce particle size. The particle size can be measured by any acceptable method. Examples include sieving, optical or electron microscope analysis, laser diffraction, x-ray diffraction, sedimentation, elutriation, microscope counting, Coulter counter, and Dynamic Light Scattering.

Defining PSD by Lower and Upper Endpoints

The upper endpoint (UEP) can be selected to provide desired reactivity and/or fineness in conjunction with or independent of the lower endpoint (LEP) and/or a desired particle packing density in conjunction with one or more coarser SCMs. The UEP (e.g., D85, D90, D95 or D99) can be equal to or less than about 35 µm, 30 µm, 27.5 µm, 25 µm, 22.5 µm, 20 µm, 18 µm, 16.5 µm, 15 µm, 13.5 µm, 12 µm, 11 µm, or 10 µm. The lower UEP range limit can be about 8 µm, 9 µm, 10 µm, 11 µm, 12 µm, 13 µm, 14 µm or 15 µm.

The lower endpoint (LEP) can be selected to provide desired water demand and/or fineness in conjunction with or independent of the upper endpoint (UEP) and/or desired particle packing density in conjunction with one or more finer SCMs. The LEP (e.g., D1, D5, D10 or D15) can be equal to or greater than about 1.0 µm, 1.25 µm, 1.5 µm, 1.75 µm, 2 µm, 2.5 µm, 3 µm, 4 µm, 5 µm, 6 µm, 7 µm, or 8 µm. The upper LEP limit can be about 6 µm, 8 µm, 10 µm, 12 µm or 15 µm.

The UEP and LEP can also define the spread (UPE-LEP) of the hydraulic cement. By way of example, depending on the UEP and LEP of the cement and ability or limitations of processing equipment to produce narrow PDS cements, the spread can be less than about 30 µm, 25 µm, 22.5 µm, 20 µm, 17.5 µm, 15 µm, 13 µm, 11.5 µm, 10 µm, 9 µm, 8 µm, 7 µm, 6 µm, 5 µm, or 4 µm.

Defining PSD by UEP/LEP

In another embodiment, the ratio UEP/LEP can define a narrow PSD cement having desired reactivity, fineness and/or particle packing density in conjunction with one or more SCMs. The UEP/LEP (e.g., D90/D10) of narrow PSD cements can be less than the ratio of Types I-V cements as defined by ASTM C-150. According to several embodiments, the UEP/LEP can be less than or equal to about 25, 22.5, 20, 17.5, 15, 12.5, 10, 8, 6, 5, 4.5, 4, 3.5, 3, 2.5 or 2.

It will be appreciated that defining the PSD of a narrow PSD cement by ratio UEP/LEP is not limited by a particular UEP or LEP or range of particle sizes. For example, a first hypothetical narrow PSD cement having a D90 of 15 µm and a D10 of 3 µm has a UEP/LEP (i.e., D90/D10) of 5 and spread (D90–D10) of 12 µm. By comparison, a second hypothetical narrow PSD cement having a D90 of 28 µm and a D10 of 7 µm has a UEP/LEP (i.e., D90/D10) of 4 and a spread (D90–D10) of 21 µm. While the spread of the second hypothetical narrow PSD cement is greater the UEP/LEP (i.e., D90/D10) is smaller than those of the first hypothetical narrow PSD cement. Thus, the second hypothetical cement has a narrower PSD compared to the first hypothetical cement as defined by UEP/LEP (i.e., D90/D10) even though the spread is greater.

Exemplary SCM Fractions

The PSD of one or more SCM fractions can be defined by the D10, D50 And D90, with the D10 approximating the lower PSD endpoint (LEP), the D90 approximating the upper PSD endpoint (UEP), and the D50 approximating the mean particle size ("MPS"). In other embodiments, the D1, D5, D15 or intermediate value can be used to approximate LEP, the D85, D95, D99 or intermediate value to approximate UEP, and the D40, D45, D55, D60 or intermediate value to approximate MPS. In some cases, the PSD of a fine SCM fraction may be defined mainly or exclusively in terms of the MPS and/or the UEP, while the PSD of a coarse SCM fraction may be defined mainly or exclusively in terms of the MPS and/or the LEP.

Fine SCM Fraction

Blending a fine SCM fraction with a narrow PSD cement can "replace" at least a portion of ultrafine cement particles, help disperse cement particles, fill fine pore spaces, increase fluidity, increase strength, increase particle packing density, and decrease permeability.

To achieve particle packing relative to the narrow PSD cement, the MPS of the narrow PSD cement fraction can be at least about 3.0 times, 3.25 times, 3.5 times, 3.75 times, 4 times, 4.5 times, 5 times, 5.5 times, or 6 times the MPS of the fine SCM fraction (e.g., about 3.0-10 times, 3.25-8 times or 3.5-6 times). In some cases, the engineered cement-SCM blend may include one or more coarse SCM fractions that, together with the narrow PSD cement fraction, provide sufficient particle packing density that the fine SCM fraction may be merely gap graded relative to the cement fraction (e.g., where the MPS of the cement fraction is less than 3.0 times, 2.8 times, 2.7 times, 2.6 times, or 2.5 times the MPS of the fine SCM fraction).

The UEP of the fine SCM fraction can be selected to be less than, approximately equal to, or greater than the LEP of the narrow PSD cement fraction. In general, the lower the UEP of the fine SCM fraction is relative to the LEP of the cement fraction, the higher is the particle packing density. According to several embodiments of the invention, the degree of overlap can be less than about 25%, 18%, 12%, 8%, 4% or 2% by weight of the combined fractions. In other embodiments, there may be a gap of at least about 1%, 2.5%, 5%, 7.5% 10%, 12.5%, 15%, 17.5% or 20% between the UEP of the fine SCM and the UEP of the narrow PSD cement.

The UEP (e.g., D85, D90, D95 or D99) of a fine SCM can be less than about 18 μm, 15 μm, 12 μm, 10 μm, 9 μm 8 μm, 7 μm, 6 μm, 5 μm, 4.5 μm, 4 μm, 3.5 μm, or 3 μm. The lower UEP range limit can be about 1 μm, 2 μm or 3 μm. The LEP (e.g., D1, D5, D10 or D15) can be equal to or greater than about 0.01 μm, 0.05 μm, 0.1 μm, 0.5 μm, 1.0 μm, 1.25 μm, 1.5 μm, 1.75 μm, 2 μm, 2.5 μm, 3 μm, 4 μm, or 5 μm. The upper LEP range limit can be about 8 μm, 6 μm, 5 μm or 4 μm.

Coarse SCM Fraction

Blending a coarse SCM fraction with a narrow PSD cement can "replace" coarse cement particles, increase particle packing, provide a filling effect using a less expensive component, lower the w/cm, increase fluidity, increase strength, reduce shrinkage, and reduce creep.

To achieve particle packing relative to the narrow PSD cement, the MPS of the coarse SCM fraction can be at least 3.0 times, 3.25 times, 3.5 times, 3.75 times, 4 times, 4.25 times, 4.5 times, 5 times, 5.5 times, or 6 times the MPS of the narrow PSD cement fraction (e.g., about 3.0-10 times, 3.25-8 times or 3.5-6 times). In some cases, the engineered cement-SCM blend may include a fine SCM fraction and/or a second coarser SCM fraction that, together with the narrow PSD cement fraction, provides sufficient particle packing density that the coarse SCM fraction may be merely gap graded relative to the cement fraction (e.g., where the MPS of the coarse SCM fraction is less than 3.0 times, 2.8 times, 2.7 times, 2.6 times, or 2.5 times the MPS of the narrow PSD cement fraction).

The LEP of the coarse SCM fraction can be selected to be less than, approximately equal to, or greater than the UEP of the narrow PSD cement fraction. In general, the higher the LEP of the coarse SCM fraction is relative to the UEP of the cement fraction, the higher is the particle packing density. According to several embodiments of the invention, the degree of overlap can be less than about 25%, 18%, 12%, 8%, 4% or 2% by weight of the combined fractions. In other embodiments, there may be a gap of at least about 1%, 2.5%, 5%, 7.5%, 10%, 12.5%, 15%, 17.5% or 20% between the LEP of the coarse SCM and the LEP of the narrow PSD cement.

The LEP (e.g., D1, D5, D10 or D15) of a coarse SCM can be equal to or greater than about 8 μm, 10 μm, 12.5 μm, 15 μm, 17.5 μm, 20 μm, 22.5 μm, 25 μm, 30 μm, 35 μm, 40 μm, or 50 μm, with an upper LEP range limit of about 30 μm, 40 μm, 50 μm, 60 μm, 70 μm, 80 μm or 90 μm. The UEP (e.g., D85, D90, D95 or D99) of a coarse SCM can be less than about 300 μm, 250 μm, 200 μm, 175 μm, 150 μm, 125 μm, 110 μm, 100 μm, 90 μm, 85 μm, 80 μm, 75 μm, 70 μm, 65 μm, or 60 μm, with a lower UEP range limit of about 30 μm, 40 μm, 50 μm, or 60 μm.

Second Coarse SCM

In the case where the cement-SCM blend includes a narrow PSD cement fraction having a relatively low UEP and/or a coarse SCM fraction having a relatively low UEP, it may be desirable to include a second coarse SCM fraction that has a higher MPS than the MPS of the first coarse SCM fraction, advantageously is higher LEP than the UEP of the first coarse SCM (e.g., in order to provide additional particle packing relative to the narrow PSD cement fraction and/or fine aggregate in concrete or mortar).

The MPS of the second coarse SCM fraction can differ by a multiple of 3.0 or more relative the MPS of the first coarse SCM fraction (e.g., so as to provide an "ultra-coarse SCM fraction) and/or fine aggregate (e.g., sand) to maximize particle packing potential. Alternatively, the second coarse SCM fraction may be merely gap graded relative to the first coarse SCM fraction and/or fine aggregate (e.g., where the MPS of the second coarse SCM fraction differs by a multiple of less than 3.0. 2.75, 2.5, 2.0, or 1.5 relative to the MPS of the first coarse SCM fraction and/or fine aggregate).

Alternatively, two different coarse SCMs of similar PSD but having different mineral constituents can be used to provide different effects. For example, using coarse fly and a coarse limestone can broaden the PSD of the overall cement blend but offer different benefits. Coarse fly ash can reactive pozzolanically over time, at least in theory, but does not contribute much to early strength. Coarse limestone does not react pozzolanically but can provide nucleation sites and/or form calcium carbonaluminates in order to accelerate early strength gain. Together, coarse fly ash and coarse limestone can boost both early and late strengths.

Cement-SCM Blends

Cement-SCM blends can be used in place of OPC, site blends of OPC and SCM, interground blends, and other cements known in the art. They can be used as sole or supplemental binder to make concrete, ready mix concrete, bagged concrete, bagged cement, mortar, bagged mortar, grout, bagged grout, molding compositions, or other fresh or dry cementitious compositions known in the art. Cement-SCM blends can be used to manufacture concrete and other cementitious compositions that include a hydraulic cement binder, water and aggregate, such as fine and coarse aggregates. Mortar typically includes cement, water, sand, and lime and is sufficiently stiff to support the weight of a brick or concrete block. Oil well cement refers to cementitious compositions continuously blended and pumped into a well bore. Grout is used to fill in spaces, such as cracks or crevices in concrete structures, spaces between structural objects, and spaces between tiles. Molding compositions are used to manufacture molded or cast objects, such as pots, troughs, posts, walls, floors, fountains, ornamental stone, and the like.

Water is both a reactant and rheology modifier that permits a fresh cementitious composition to flow or be molded into a desired configuration. Hydraulic cement reacts with water, binds the other solid components together, and is most responsible for early strength development and can contribute to later strength development. Blends with high PPD have reduced void space, which reduces water demand and increases workability for a given quantity of water.

Cement-SCM blends can be dry-blended or formed in situ when making a fresh cementitious composition containing water and aggregate. Cement-SCM blends include binary, ternary, quaternary blend, and other blends. In some embodiments, at least one SCM fraction is blended with at least one hydraulic cement fraction. In some embodiments cement-SCM blends may include one or more chemical additives that affect the chemistry of the aqueous solution, such as accelerating, retarding, and/or water-reducing admixtures.

Binary, ternary and quaternary blends may include a cement fraction, one or more SCM fractions, and lime, including quicklime (CaO) and/or hydrated lime ($Ca(OH)_2$). Although quicklime is more soluble than hydrated lime, when exposed to water quicklime is converted to hydrated lime. Therefore, the solubility of hydrated lime, or calcium hydroxide, in water is the limiting factor. The solubility of calcium hydroxide in water is reportedly 0.189 g/100 mL at 0° C., 0.173 g/100 mL at 20° C., and only 0.066 g/100 mL at 100° C. The temperature of concrete when hydrating is usually above 20° C. and below 100° C. Therefore, the solubility is somewhere between 0.173 g/100 mL and 0.066 g/100 mL, and it changes with increased temperature. In general, hydrated lime (e.g., Type S lime) is readily available and easier and safer to handle than quicklime. Hydrated lime also does not consume water when mixed into a cementitious composition and therefore does not affect water demand as much as quicklime. Quicklime may form either smaller or larger particles of hydrated lime when blended into water depending on how it is mixed and how fast it reacts to form calcium hydroxide. More vigorous mixing when initially added should yield finer particles. Slower mixing should yield larger particles. It has been found that hydrated lime typically works more predictably than quicklime, with similar or even superior results from the standpoint of early and late strength development.

In some embodiments, the amount of added lime is below, at or above the amount required to achieve or maintain saturation in water. The amount of lime required to maintain a saturated pore solution is dependent on factors such as the amount of free lime released from the hydraulic cement during hydration, the amount of lime consumed during cement hydration and the pozzolanic reaction, and the solubility of lime, which decreases with increased temperature. Increased temperature may accelerate consumption of lime. Using a more reactive pozzolan may deplete lime faster than a less reactive pozzolan. The ideal amount of added lime is that amount that maintains a pore solution saturated with calcium ions over time in conjunction with lime being released from the cement. A slight excess of lime can be added as a reservoir to provide additional lime as some of it is depleted.

In some embodiments, the amount of added lime is 1-10 times, or 1.2-8 times, or 1.5-5 times the amount required to achieve saturation on the amount of added water. One purpose of the added lime is to maintain the pore solution at a pH similar to the pH when using OPC alone. Some SCMs, including fly ash and, in particular, ultrafine fly ash (UFFA), can deplete calcium ions and lower pH of the pore solution, which can retard hydration, including cement hydration and/or the pozzolanic reaction. Adding supplemental lime helps maintain a high pH characteristic of normal cement hydration. Because lime does not otherwise contribute to concrete strength but can actually weaken it, it has been found that using a relatively small amount of supplemental lime works better than using either no added lime or too much added lime. In some embodiments, the amount of supplemental lime based on the total weight of cementitious binder (cement and SCM) can be about 0.1% to about 10%, or about 0.2% to about 8%, or about 0.3% to about 6%, or about 0.4% to about 4%, or about 0.45% to about 3%, or about 0.5% to about 2.5%, or about 0.6% to about 2%, or about 0.65% to about 1.5% (e.g., 1%).

Limestone powder can be used in addition to or instead of lime to increase strength development. While calcium carbonate has substantially lower solubility than lime (only 0.013 g/L at 25°), it can still contribute some quantity of calcium ions. It can also provide nucleation sites for the formation of cement hydration products, mainly calcium silicate hydrates, calcium aluminate hydrates, calcium carboaluminates, and calcium carboaluminoferrites, and the like. Where the SCM contains soluble aluminates that can deplete sulfate and alter the sulfate balance of the hydraulic cement, the use of limestone can partially or entirely mitigate the sulfate imbalance due to the formation of calcium carboaluminates.

Where limestone is not used or where it is otherwise desired to raise the quantity of sulfate in the cement binder system, supplemental sulfate can added, such as calcium sulfate hemihydrate (Plaster of Paris), calcium sulfate dihydrate (gypsum), and alkali metal sulfates.

When used, the amount of supplemental sulfate based on the total weight of cementitious binder (cement and SCM) can be about 0.1% to about 10%, or about 0.2% to about 8%, or about 0.3% to about 6%, or about 0.4% to about 4%, or about 0.45% to about 3%, or about 0.5% to about 2.5%, or about 0.6% to about 2%, or about 0.65% to about 1.5% (e.g., 1%).

EXAMPLES

Comparative Examples 1A-1C

Figure 1B:
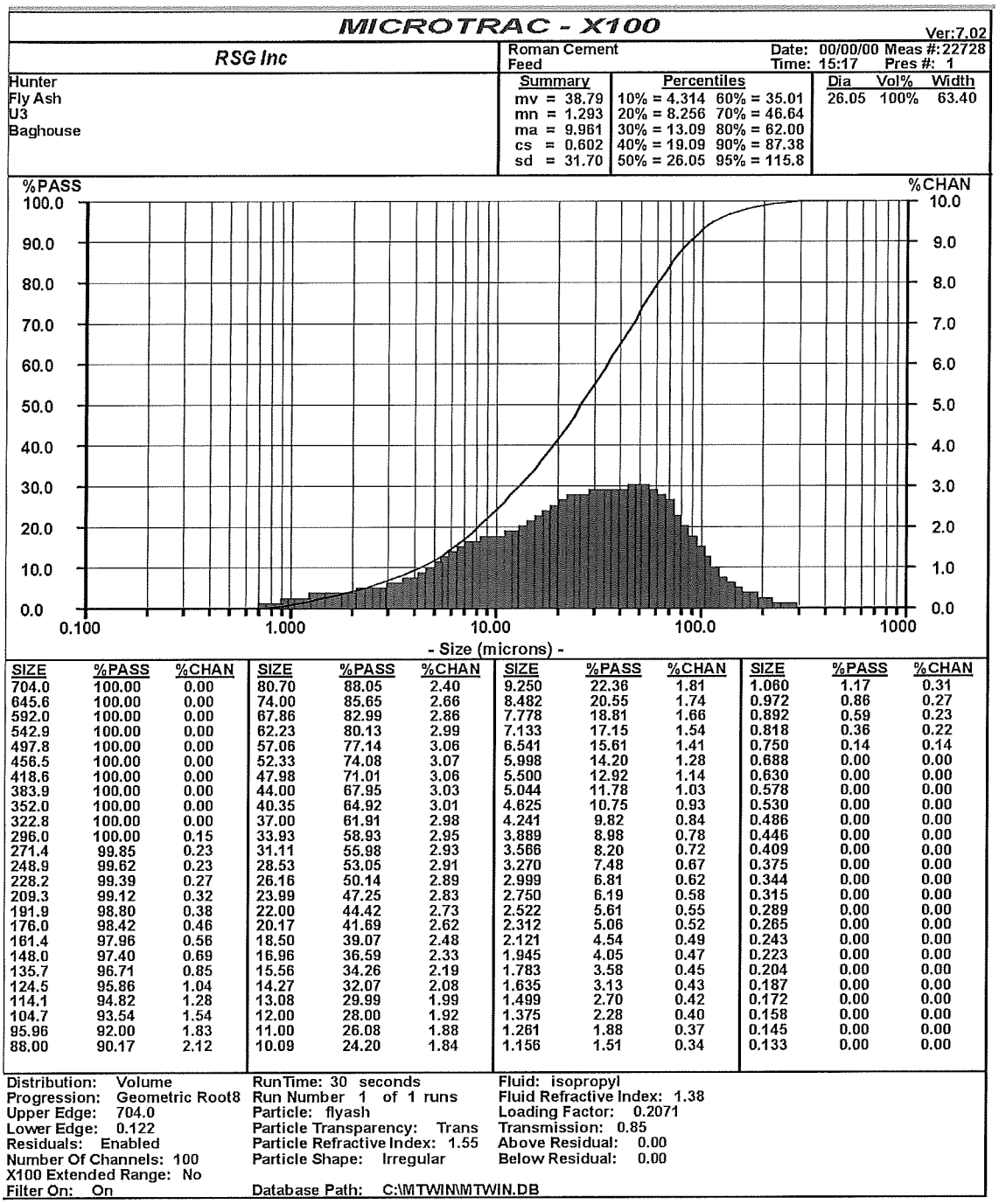
Figure 1C:
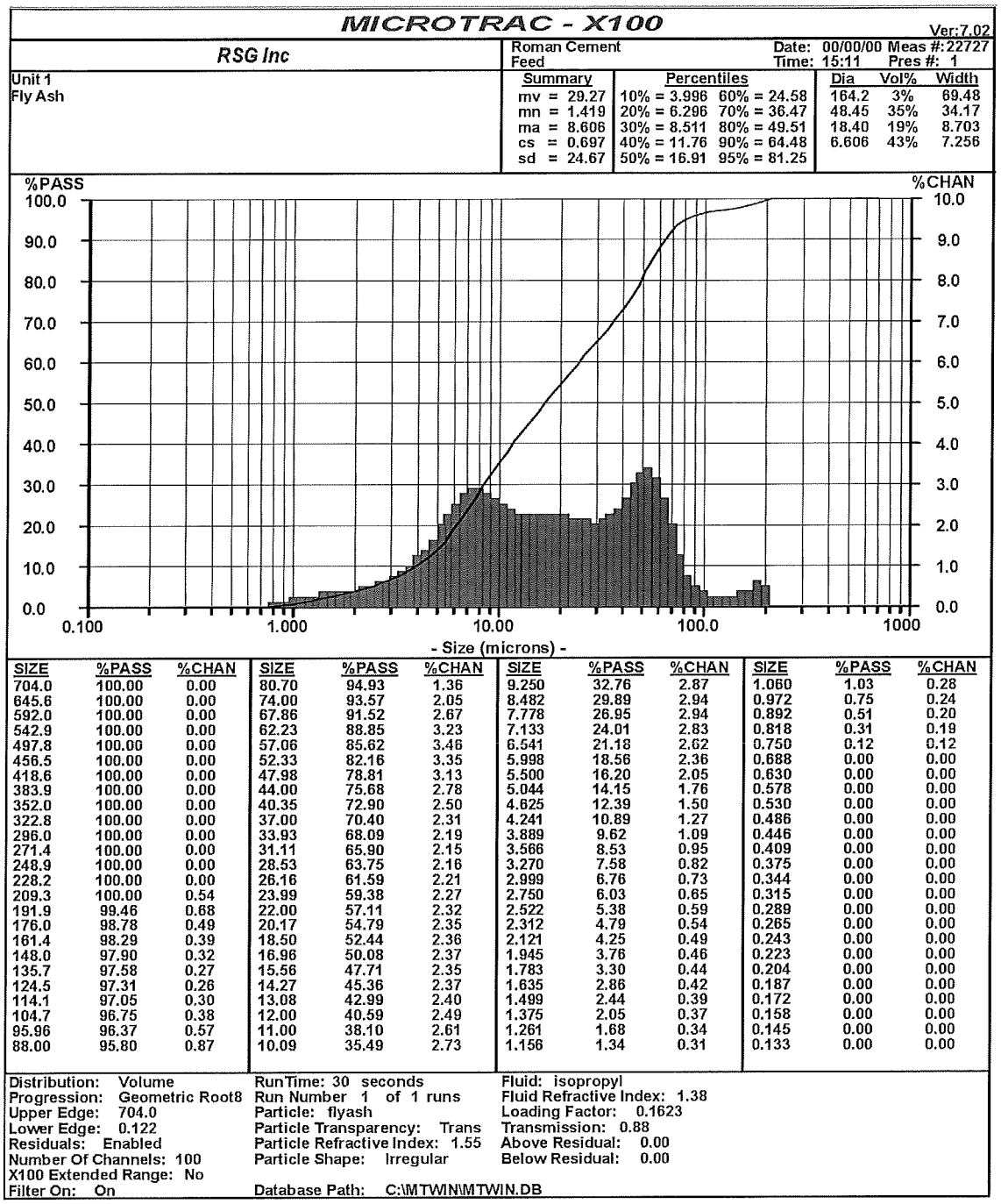

Examples 1A-1C are three fly ashes produced by three different coal fired power plants: Huntington, Utah power plant, Hunter, Utah power plant, and Jim Bridger, Wyo. power plant. FIGS. 1A-1C show the particle size distribution (PSD) results of a particle size analysis (PSA) that was performed on the three fly ashes of Examples 1A-1C, respectively, using a Microtrac-X100 particle size analyzer operated by RSG, Inc., Sylacauga, Ala.

FIG. 1A shows the PSD of an unprocessed fly ash produced by Unit 1 of the Huntington, Utah power plant (Example 1A). The D90 is approximately 105 µm, the D50 is approximately 29 µm, and the D10 is approximately 4.5 µm. This fly ash has high carbon content and is either non-conforming or barely conforming as Class F fly ash under ASTM C-618. The fly ash was of substandard quality (e.g., with a reactivity index below 75 and/or that contained excessive coarse carbon particles and/or that is otherwise landfilled and not used in concrete).

FIG. 1B shows the PSD of an unprocessed fly ash produced by Unit 3 of the Hunter, Utah power plant (Example 1B). The D90 is approximately 88 µm, the D50 is approximately 26 µm, and the D10 is approximately 4.3 µm. This fly ash has a moderately high carbon content and is either non-conforming or barely conforming as Class F fly ash under ASTM C-618 based on its SAF (total combined silica, alumina, and ferric oxide). The fly ash was of substandard quality (e.g., with a reactivity index below 75 and/or that contained excessive coarse carbon particles and/or that is otherwise landfilled and not used in concrete).

FIG. 1C shows the PSD of an unprocessed fly ash produced by Unit 1 of the Jim Bridger, Wyo. power plant (Example 1C). The D90 is approximately 65 µm, the D50 is approximately 17 µm, and the D10 is approximately 4 µm. This fly ash qualifies as Class F fly ash under ASTM C-618.

Example 2A

Figure 2A:
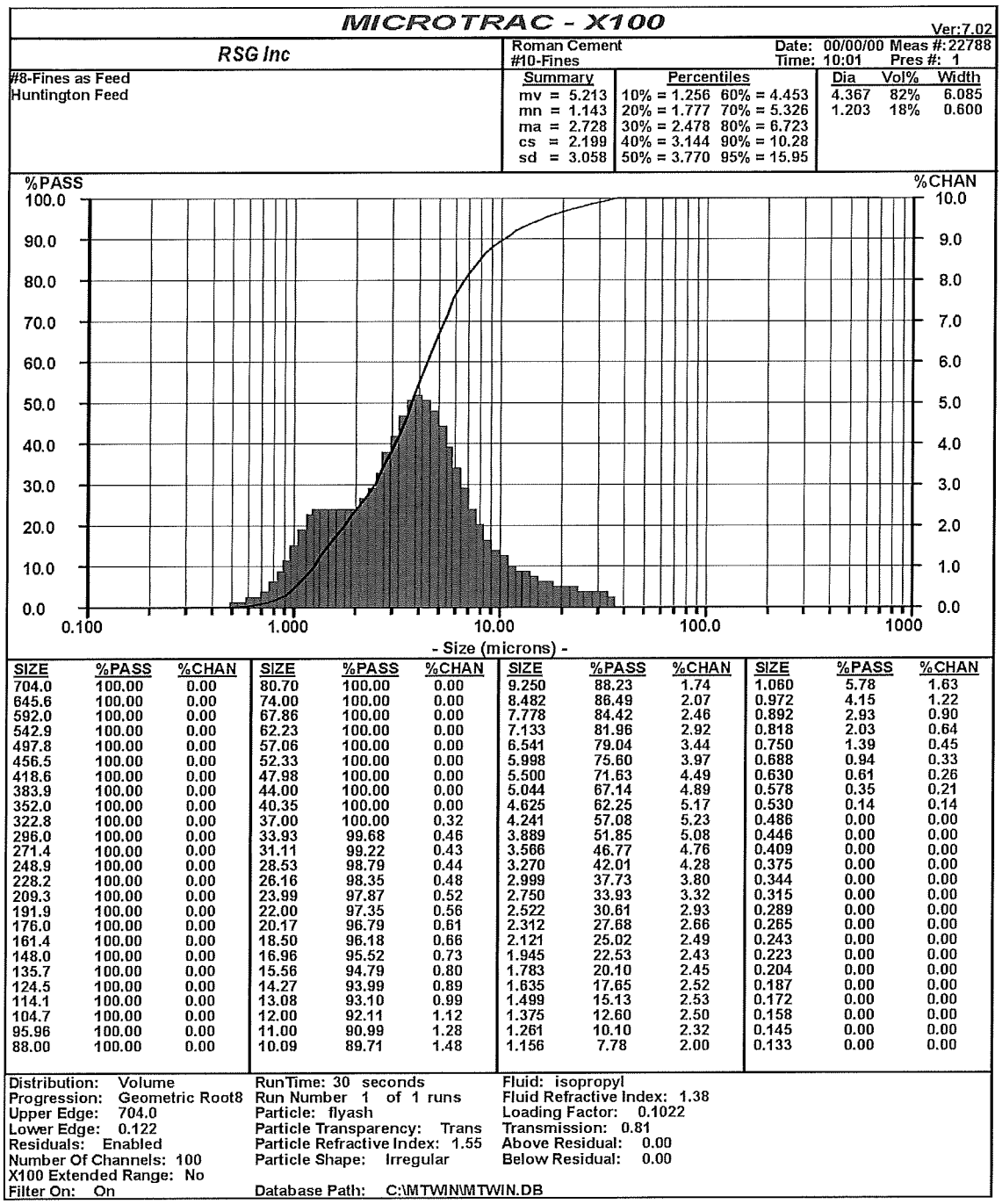
FIG. 2A is a graph illustrating the PSD of an ultrafine fly ash produced by classifying the fly ash represented in FIG. 1A.

The fly ash of Example 1A was classified using an air classifier operated by RSG, Inc. FIG. 2A shows the PSD of an ultrafine fly ash produced by the air classifier. The D90 is approximately 10.5 µm, the D50 is approximately 3.8 µm, and the D10 is approximately 1.25 µm. This fly ash has conforming carbon content and very high reactivity owing to its high preponderance of particles of very high fineness. The UFFA had a reactivity index above 75 and an LOI (loss on ignition) that indicates less than 6% carbon as required by ASTM C618. This suggests that classification is a beneficiation process that is able to make a commercially and technically acceptable fly ash from an unacceptable fly ash. A calorimetry test indicated some degree of set retardation when used with OPC at 40%.

Example 2B

Figure 2B:
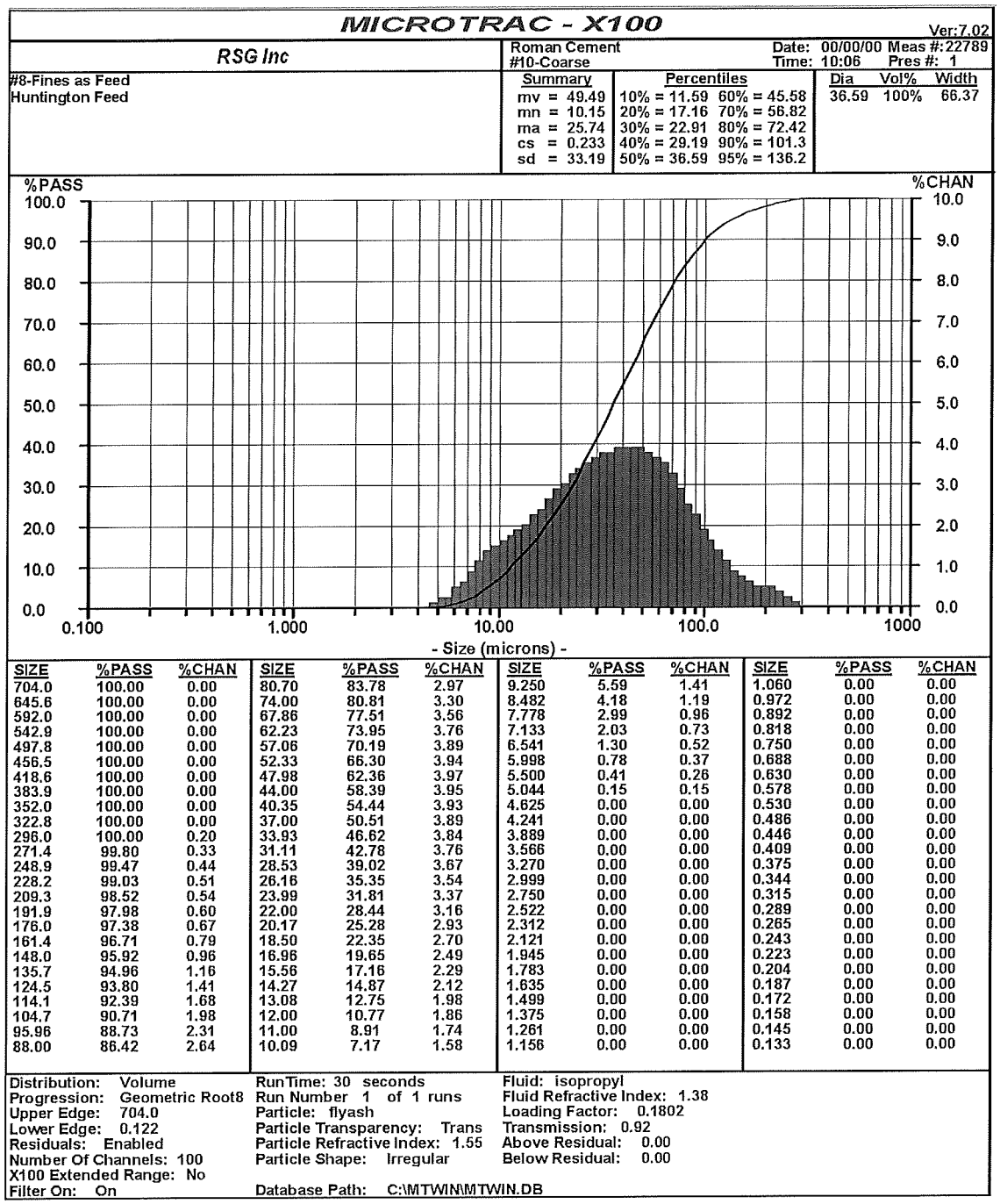
FIG. 2B is a graph illustrating the PSD of a coarse fly ash co-produced with the ultrafine fly ash represented in FIG. 2A.

FIG. 2B shows the PSD of a coarse fly ash fraction left over from the production of the ultrafine fly ash of Example 2A. The D90 is approximately 105 µm, the D50 is approximately 37 µm, and the D10 is approximately 11.5 µm. This fly ash has high carbon content and low reactivity owing to its high preponderance of coarse particles and low preponderance of particles of high fineness. The coarse fly ash can be beneficially used as a coarse fraction in a binary or ternary blended cement and/or as a partial sand replacement and is able to increase particle packing density of the blended cement compared to the cement fraction by itself and at least partially mitigates autogenous shrinkage.

Example 2C

Figure 2C:
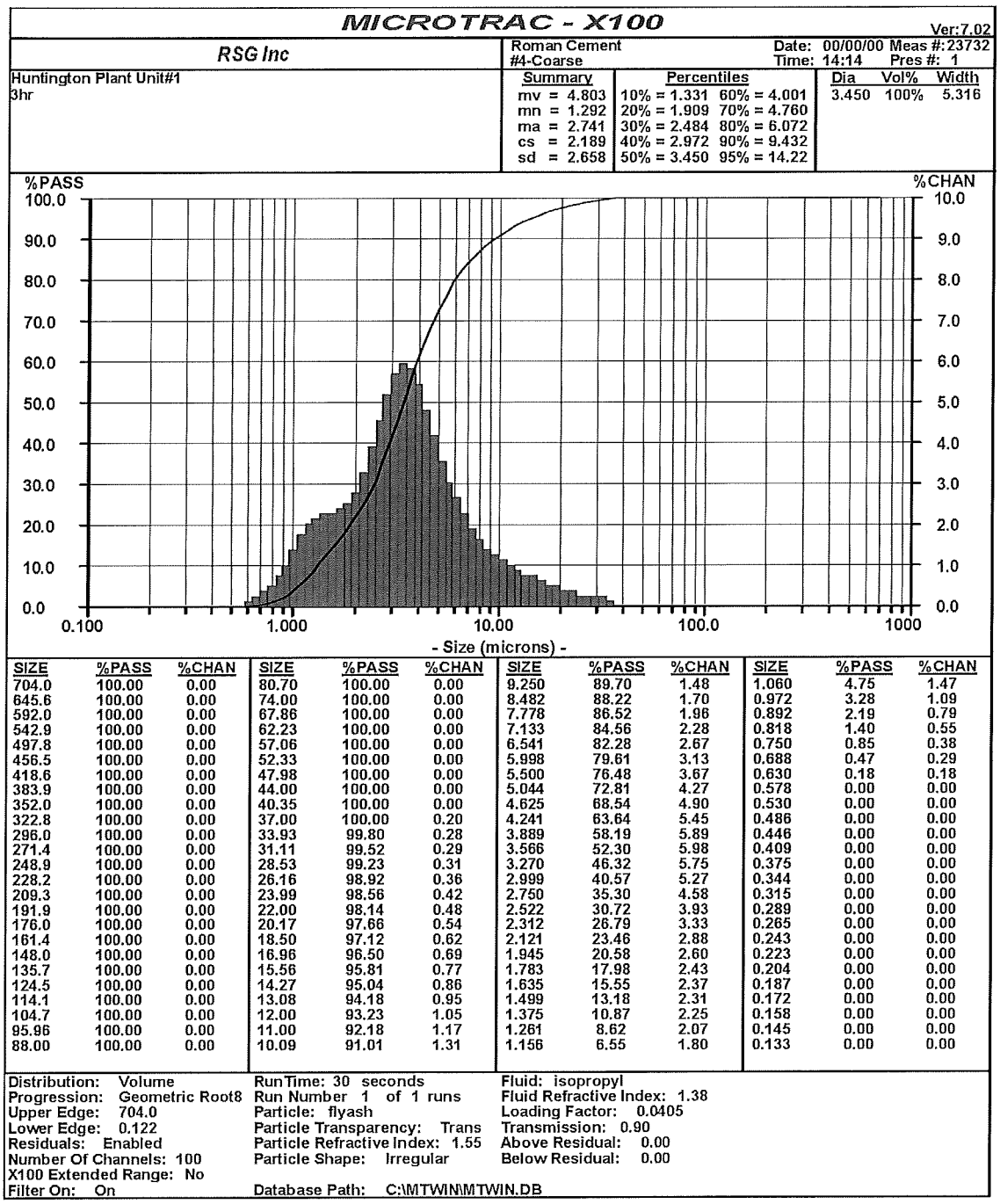
FIG. 2C is a graph illustrating the PSD of another ultrafine fly ash produced by classifying the fly ash represented in FIG. 1A.

The fly ash of Example 1A was classified a second time using an air classifier operated by RSG, Inc. FIG. 2C shows the PSD of an ultrafine fly ash produced by the air classifier. The D90 is approximately 9.5 µm, the D50 is approximately 3.5 µm, and the D10 is approximately 1.3 µm. This fly ash has conforming carbon content and very high reactivity owing to its high preponderance of particles of very high fineness. The UFFA had a reactivity index above 75 and an LOI (loss on ignition) that indicates less than 6% carbon as required by ASTM C618. This suggests that classification is a beneficiation process that is able to make a commercially and technically acceptable fly ash from an unacceptable fly ash. A calorimetry test indicated some degree of set retardation when used with OPC at 40%.

Example 3A

Figure 3A:
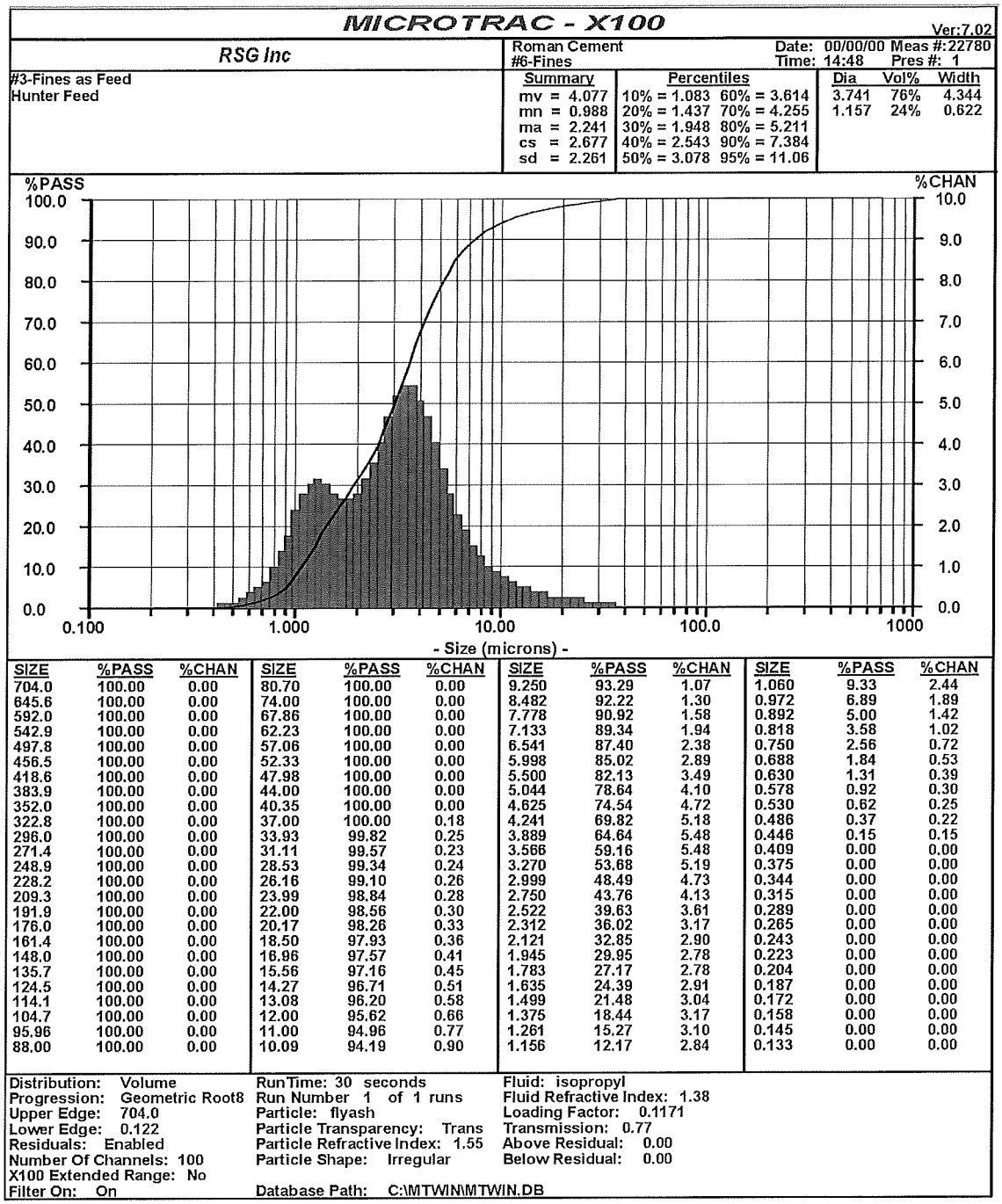
FIG. 3A is a graph illustrating the PSD of an ultrafine fly ash produced by classifying the fly ash represented in FIG. 1B.
Figure 3B:
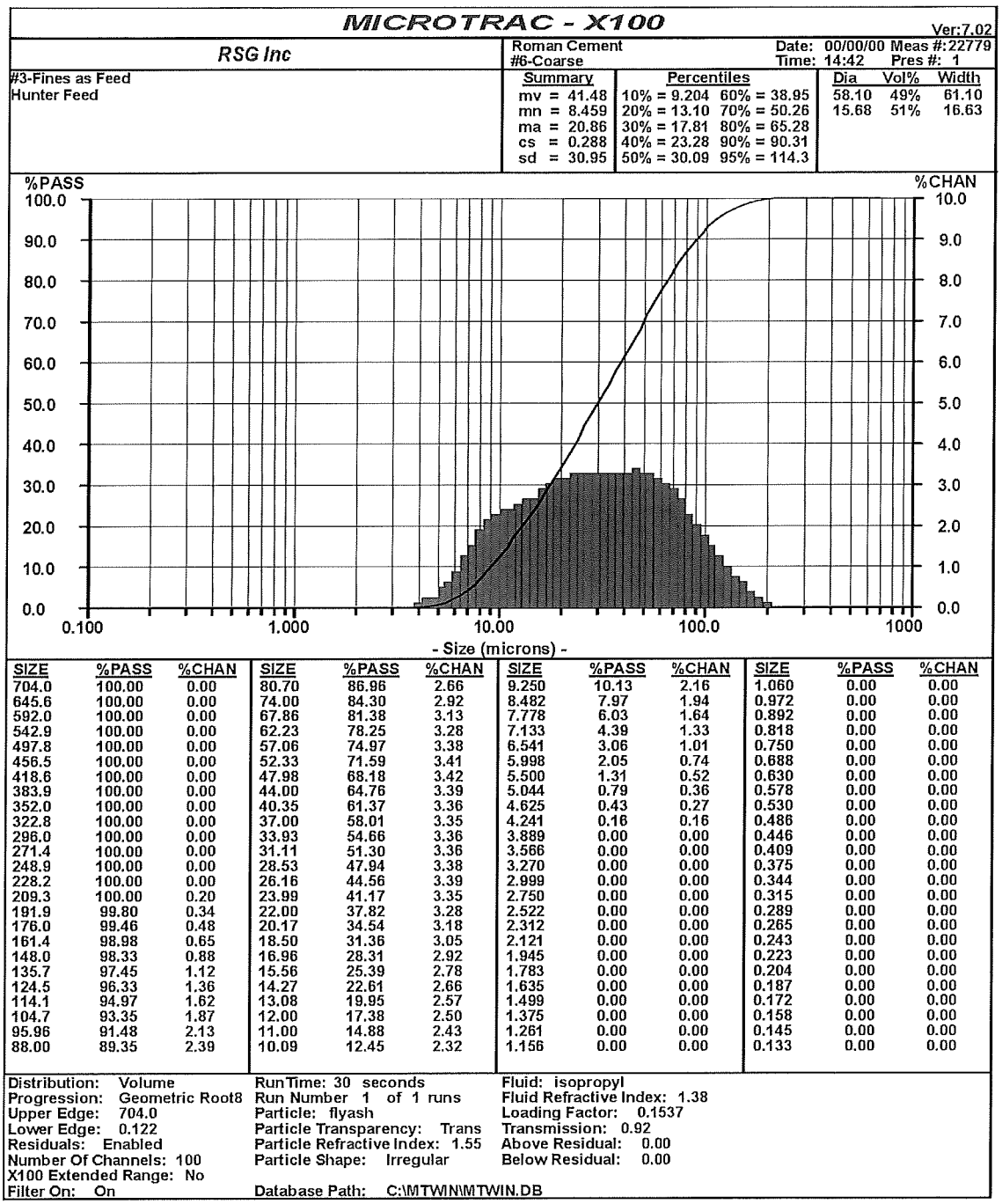
FIG. 3B is a graph illustrating the PSD of a coarse fly ash co-produced with the ultrafine fly ash represented in FIG. 3A.

The fly ash of Example 1B was classified using an air classifier operated by RSG, Inc. FIG. 3A shows the PSD of an ultrafine fly ash produced by the air classifier. The D90 is approximately 7.5 µm, the D50 is approximately 3.1 µm, and the D10 is approximately 1.1 µm. This fly ash has conforming carbon content and very high reactivity owing to its high preponderance of particles of very high fineness. It generally produced mortars and concrete of higher strength than the UFFA of Example 2A. This suggests that classification is a beneficiation process that is able to make a commercially and technically acceptable fly ash from an unacceptable fly ash. A calorimetry test indicated some degree of set retardation when used with OPC at 40%.

Example 3B

FIG. 2B shows the PSD of a coarse fly ash fraction left over from the production of the ultrafine fly ash of Example 2A. The D90 is approximately 92 µm, the D50 is approximately 31 µm, and the D10 is approximately 9.2 µm. This fly ash has moderate carbon content and low reactivity owing to its high preponderance of coarse particles and low preponderance of particles of high fineness.

Example 3C

Figure 3C:
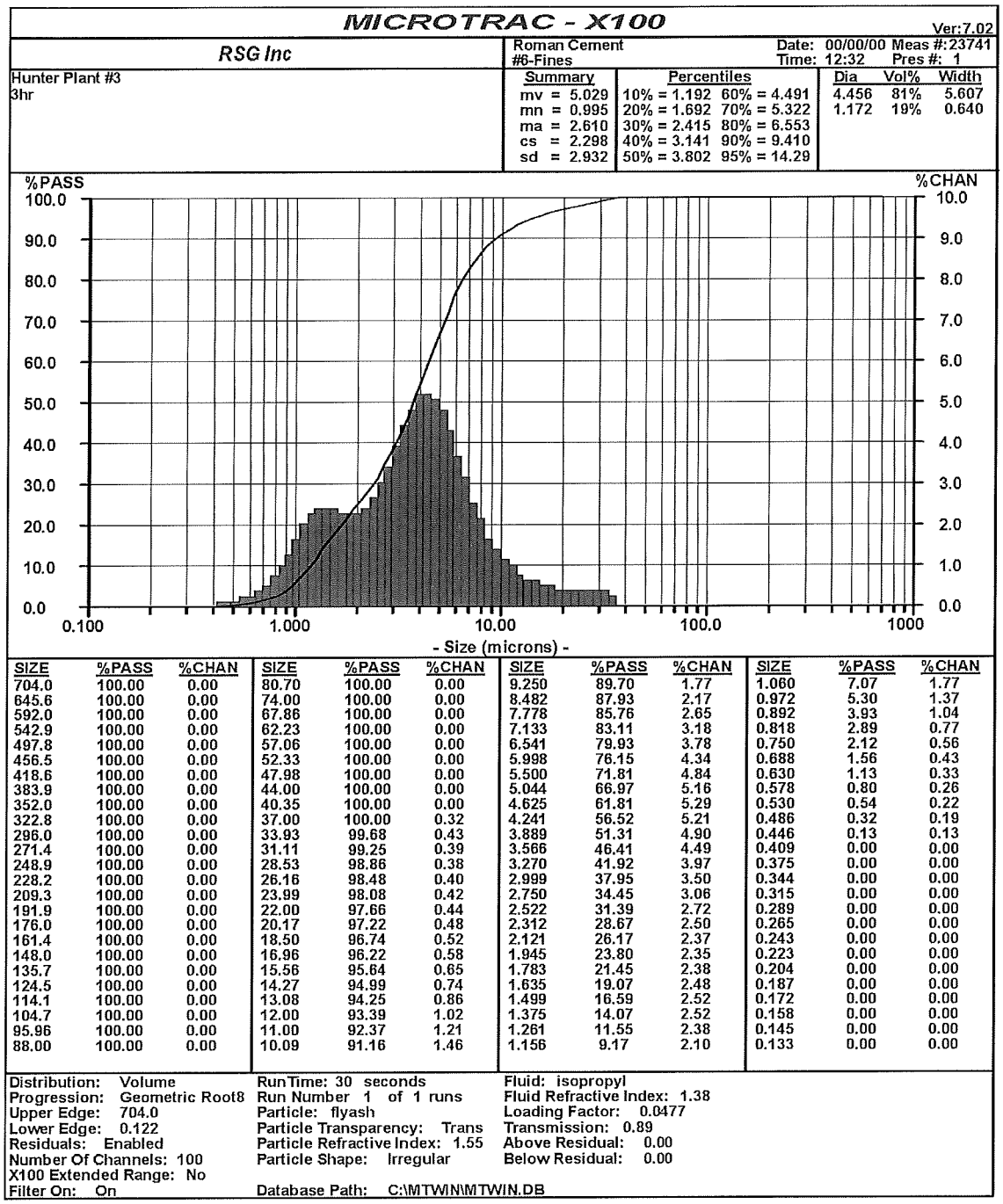
FIG. 3C is a graph illustrating the PSD of another ultrafine fly ash produced by classifying the fly ash represented in FIG. 1B.

The fly ash of Example 1B was classified a second time using an air classifier operated by RSG, Inc. FIG. 3C shows the PSD of an ultrafine fly ash produced by the air classifier. The D90 is approximately 9.3 µm, the D50 is approximately 3.8 µm, and the D10 is approximately 1.2 µm. This fly ash has conforming carbon content and very high reactivity owing to its high preponderance of particles of very high fineness.

Examples 4A-4B

Figure 4A:
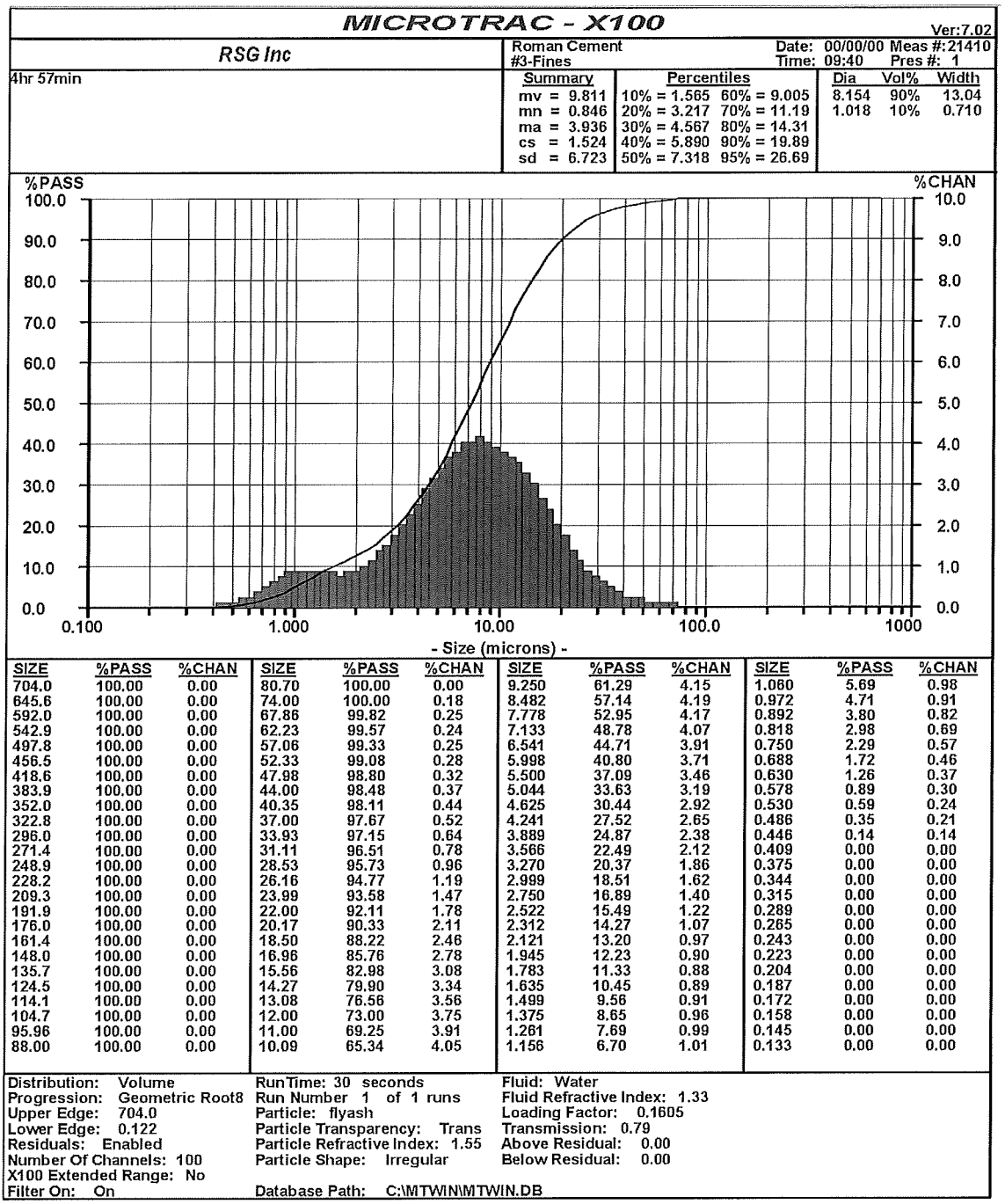
FIG. 4A is a graph illustrating the PSD of a fine fly ash produced by classifying a commercially available fly ash.

A commercially available fly ash from the Gaston, Ala., coal fired power plant owned by Boral (formerly Headwaters) was classified into coarse and fine fractions using an air classifier operated by RSG, Inc. FIG. 4A shows the PSD of a fine fly ash produced by the air classifier. The D90 is approximately 20 µm, the D50 is approximately 7.4 µm, and the D10 is approximately 1.6 µm. This fly ash has high reactivity owing to its high preponderance of particles of high fineness. The fine fly ash fraction was used as a fine SCM fraction together with a narrow PSD cement and a coarse SCM fraction (e.g., an interground blend of volcanic ash and limestone having a D90 substantially greater than the D90 of the cement fraction).

Figure 4B:
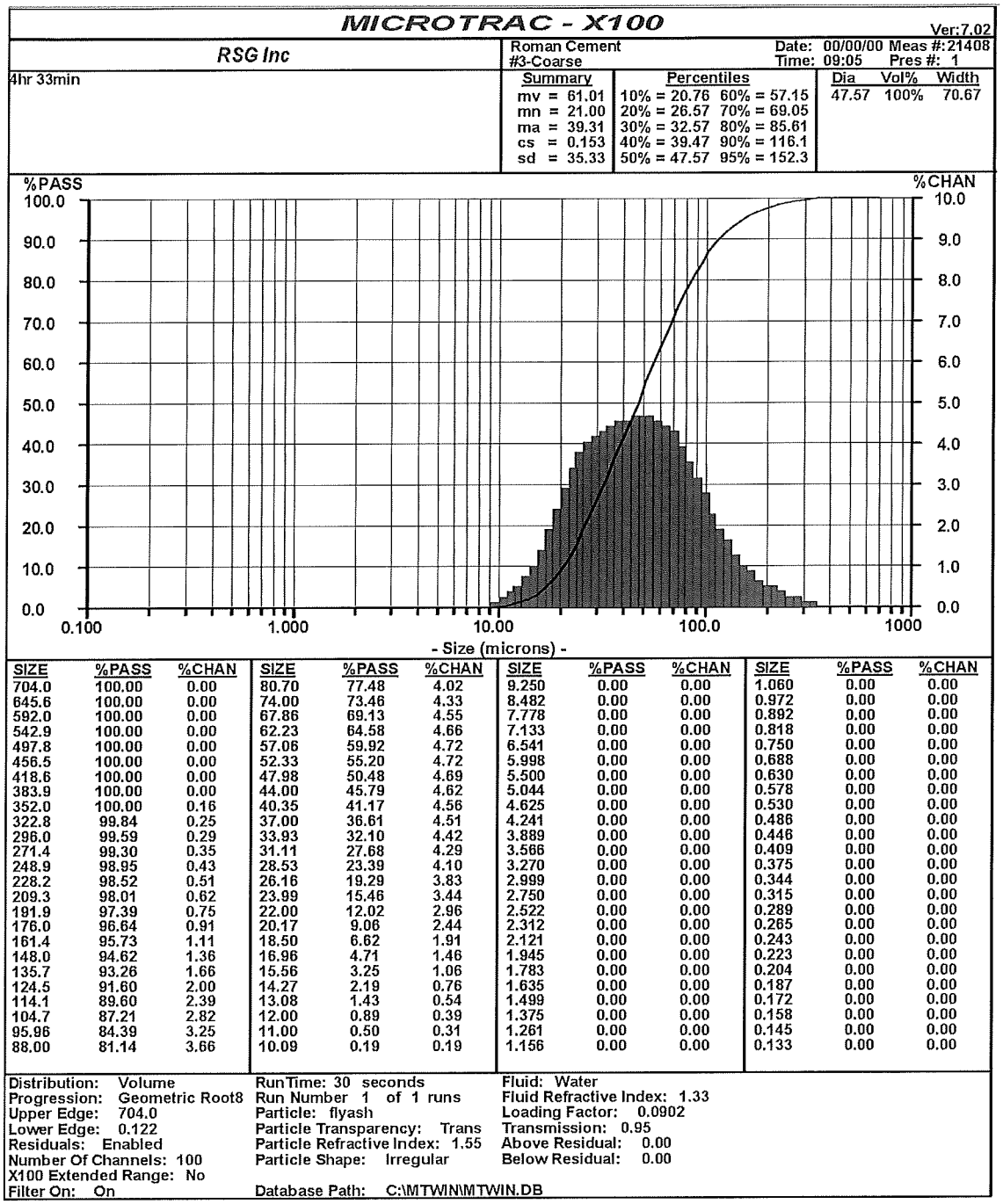
FIG. 4B is a graph illustrating the PSD of a coarse fly ash co-produced with the fine fly ash represented in FIG. 4A.

FIG. 4B shows the PSD of a coarse fly ash fraction left over from the production of the fine fly ash of Example 4A. The D90 is approximately 120 µm, the D50 is approximately 47 µm, and the D10 is approximately 21 µm. This fly ash has low reactivity owing to its high preponderance of coarse particles and low preponderance of particles of high fineness. The coarse fly ash fraction was used to make binary and ternary blended cements. In some embodiments, the coarse fly ash fraction was blended with a fine cement to make binary blends. In other embodiments, the coarse fly ash fraction was blended with a narrow PSD cement and a fine SCM to make ternary blends. Such blended cements were tested according to ASTM C109 and found to have similar or better strength than 100% OPC made from the same cement clinker and superior strength compared to traditional blended cements made using the OPC and traditional SCMs that were not particle size optimized. This was particularly true at lower w/cm, which indicates that the particle size optimization approach can provide an even greater benefit in high performance cements made at lower w/cm. Such blended cements were also tested in concrete using concrete cylinders and found to have similar or better strength than 100% OPC made from the same cement clinker and superior strength compared to traditional blended cements made using the OPC and traditional SCMs that were not particle size optimized. This was particularly true at lower w/cm, which indicates that the particle size optimization approach disclosed herein can provide an even greater benefit in high performance concretes made at lower w/cm. The coarse SCM fraction lowered the water demand compared to the fine cement by itself, increased particle packing, reduced shrinkage (autogenous and drying), and eventually reacted pozzolanically and contributed to higher long-term strength.

Examples 4C-4D

The fine fly ash fraction from Example 4A was further classified using an air classifier operated by RSG, Inc. to form three additional fly ash materials, first and second ultrafine fly Ash fractions having a target D90 of 5 μm and 10 μm, respectively, and a coarser leftover material.

Figure 4C:
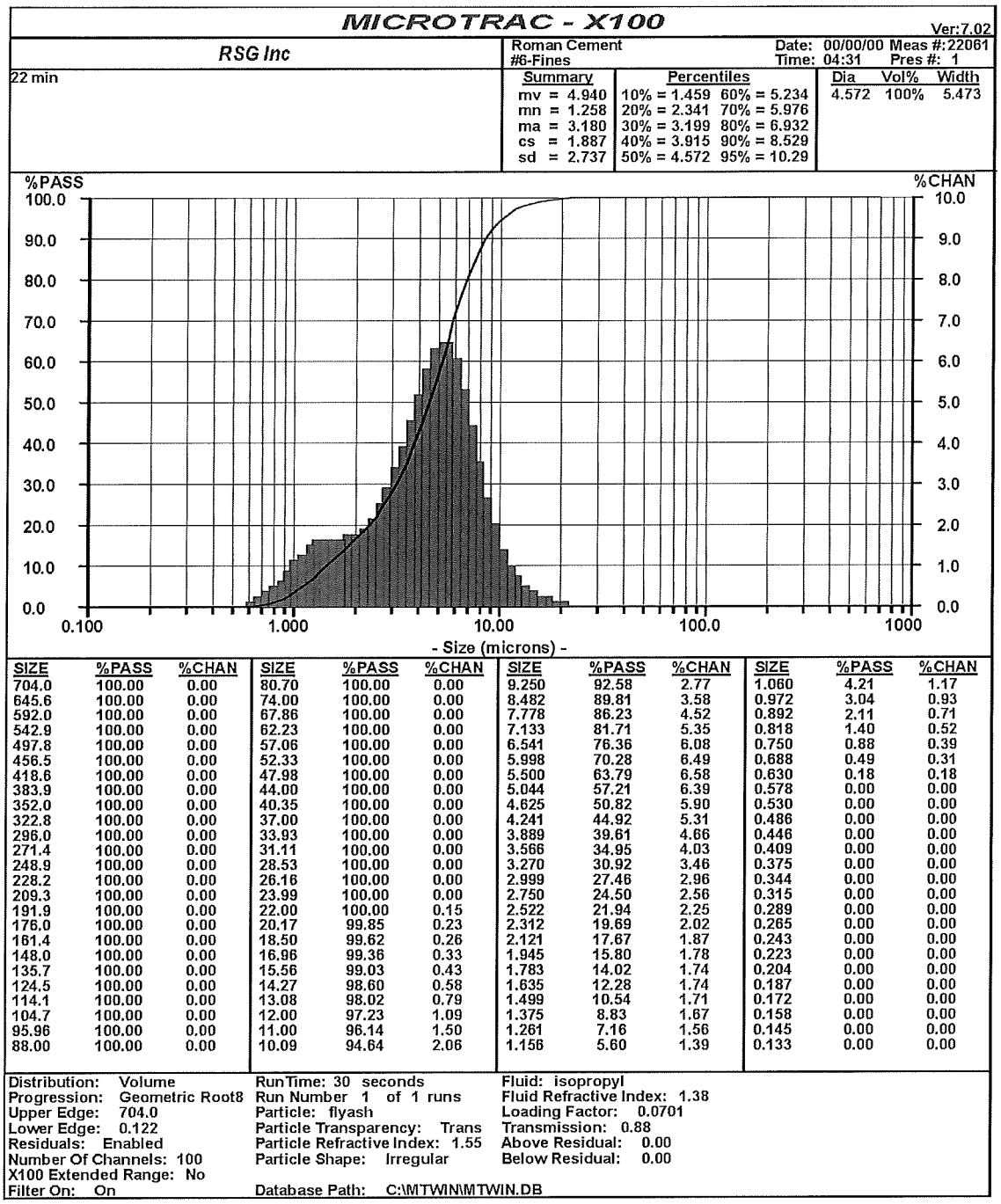
FIG. 4C is a graph illustrating the PSD of an ultrafine fly ash produced by classifying the fine fly ash represented in FIG. 4A.

FIG. 4C shows the PSD of the first ultrafine fly ash produced by the air classifier. The D90 is approximately 8.6 μm, the D50 is approximately 4.6 μm, and the D10 is approximately 1.45 μm. This fly ash has very high reactivity owing to its high preponderance of particles of very high fineness. The first ultrafine fly ash fraction was used as an ultrafine SCM in a ternary blended cement tested according to ASTM C109 and found to perform far better than the regular unprocessed fly ash from which it was made and also the fine fraction of Example 4A in terms of early and late strength contributions. The ultrafine fly ash fraction was also blended with OPC as an approximate micro silica (e.g., silica fume) substitute and found to perform adequately in this capacity. Because silica fume typically costs 5-10 times more than OPC, producing fine and ultrafine fly ash fractions from a starting fly ash is a value added process.

Figure 4D:
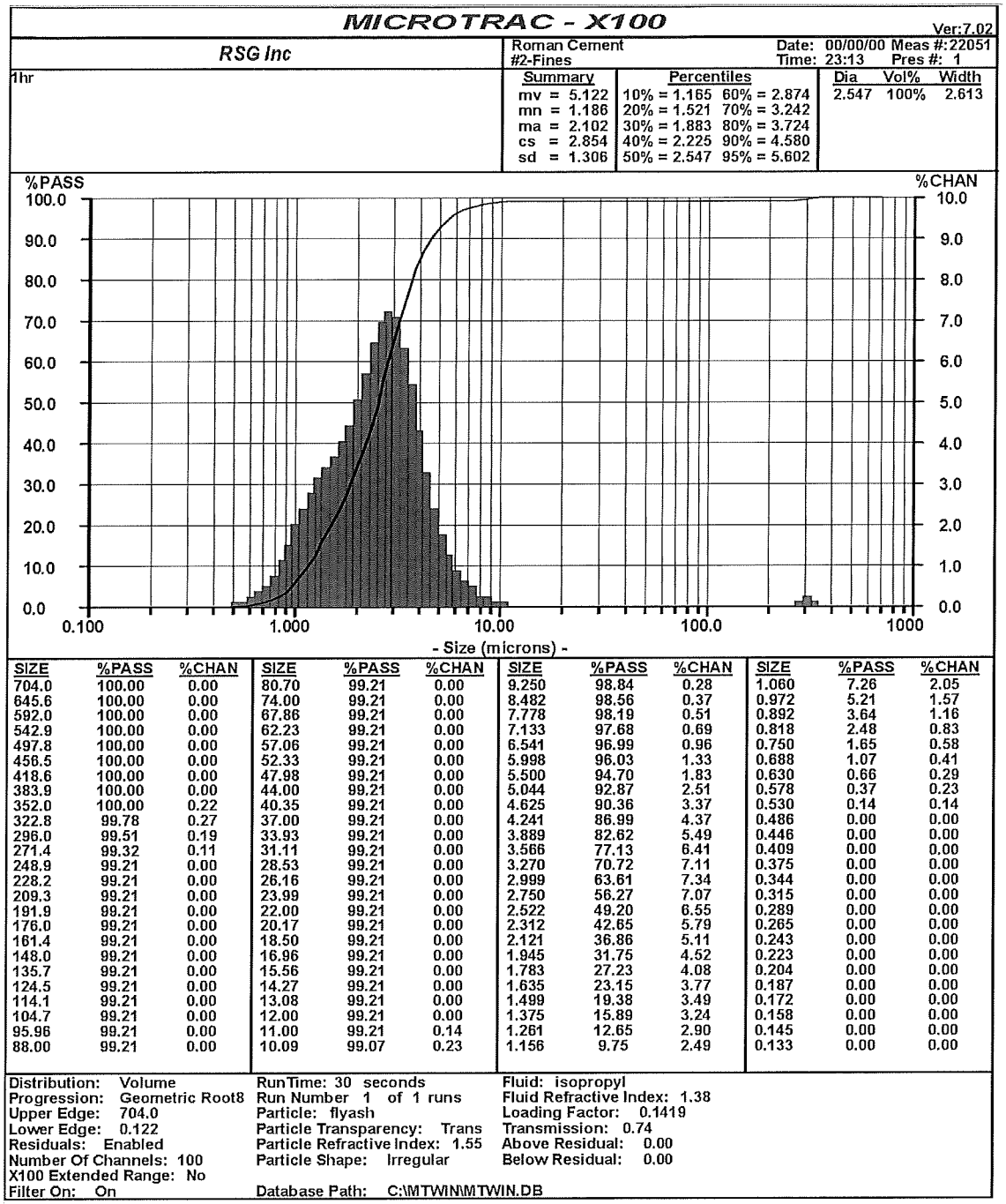
FIG. 4D is a graph illustrating the PSD of another ultrafine fly ash produced by classifying the fine fly ash represented in FIG. 4A.

FIG. 4D shows the PSD of the second ultrafine fly ash produced by the air classifier. The D90 is approximately 4.5 μm, the D50 is approximately 2.55 μm, and the D10 is approximately 1.18 μm. This fly ash has very high reactivity owing to its high preponderance of particles of very high fineness, and produced mortars and concrete of higher strength than either the fine fly ash of Example 4A or the UFFA of Example 4C.

Example 5

Figure 5:
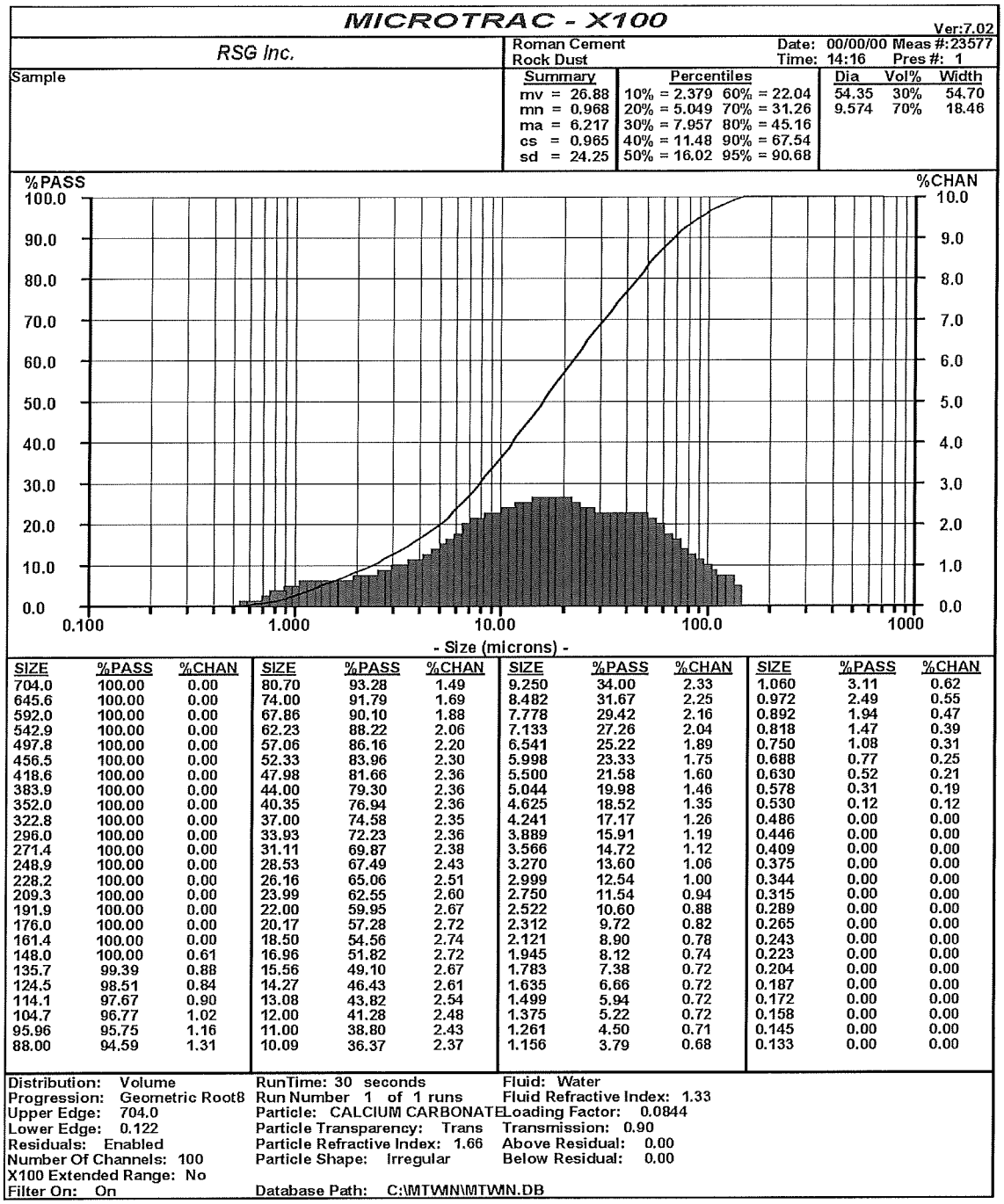
FIG. 5 is a graph illustrating the PSD of a rock dust produced as a byproduct from an aggregate quarry.

FIG. 5 shows the particle size distribution (PSD) results of a particle size analysis (PSA) that was performed on rock dust produced as a biproduct of an aggregate quarry using a Microtrac-X100 particle size analyzer operated by RSG, Inc., Sylacauga, Ala. The D90 is approximately 67 μm, the D50 is approximately 16.5 μm, and the D10 is approximately 2.5 μm. This rock dust was used to produce ternary blended cements together with UFFA materials in one or more of the preceding Examples and produced mortars and concrete of acceptable strength and low clinker content.

Examples 6-11

Concrete mixes were made using a standard rotary concrete mixer obtained from Harbor Freight. Fresh concrete was cast into 4×8 inch cylinders and tested by CMT Engineering in West Valley City, Utah. The Portland cement was a Type I/II OPC manufactured by Holcim, Devil's Slide, Utah plant. The Class F fly ash was a standard fly ash obtained from Headwaters. The calcined shale was flue dust obtained from Utelite, Coalville, Utah. The quarry fines containing at least about 90% limestone in the form of calcite were purchased from Staker-Parson. The coarse aggregate and fine aggregate were purchased from Staker-Parson. The ultrafine fly ash (UFFA) was made by classifying a waste fly ash designated for landfill either from Huntington, Utah or Hunter, Utah power plant. The concrete mixes were based on a common "6-bag" concrete mix with a design strength at 28 days of 5200 psi. The concrete mixes are expressed in terms of the quantities required to make a cubic yard of concrete and are set forth in Table 1.

TABLE 1

| Components/Compressive Strength | Example | | | | | |
|---|---|---|---|---|---|---|
| | 6 | 7 | 8 | 9 | 10 | 11 |
| Type I/II OPC (lb.) | 394.8 | 394.8 | 451.2 | 366.6 | 366.6 | 394.8 |
| Class F Fly Ash (lb.) | 84.6 | 0 | 0 | 0 | 0 | 0 |
| Calcined Shale (lb.) | 0 | 84.6 | 0 | 0 | 0 | 84.6 |
| UFFA (lb.) | 0 | 0 | 112.8 | 141 | 141 | 84.6 |
| Quarry Fines (lb.) | 163.6 | 163.6 | 0 | 101.5 | 101.5 | 56.4 |
| Type S Lime | 11.28 | 11.28 | 0 | 8.46 | 8.46 | 0 |
| Plaster of Paris | 5.64 | 5.64 | 0 | 2.82 | 2.82 | 0 |
| Coarse Aggregate (lb.) | 1650 | 1650 | 1750 | 1705 | 1705 | 1685 |
| Fine Aggregate (lb.) | 1302 | 1302 | 1338 | 1300 | 1304 | 1300 |
| Water (lb.) | 248.2 | 248.2 | 266.6 | 242.5 | 242.5 | 248.2 |
| w/cm | 0.44 | 0.44 | 0.473 | 0.43 | 0.43 | 0.44 |
| w/c | 0.63 | 0.63 | 0.59 | 0.66 | 0.66 | 0.63 |
| 3-day (psi) | 2950 | 3250 | 3010 | 2860 | 2960 | 3930 |
| 7-day (psi) | 3800 | 3960 | 4570 | 4490 | 4420 | 5670 |
| 28-day (psi) | 4850 | 5530 | 6480 | 6620 | 7390 | 7550 |
| 3-month (psi) | 6050 | 6620 | 7540 | 8310 | 8580 | 8290 |

As shown in Table 1, the concrete made using UFFA exhibited substantially superior strength at 28 days and 3 months.

Examples 12-17

Concrete mixes were made as above. The Portland cement was a Type I/II OPC manufactured by Holcim, Devil's Slide, Utah plant. The intergound cement was made by intergrinding equal masses of clinker and natural pozzolan provided by Drake Cement, Paulden, Ariz. to a D90 of 24 μin a bench scale vertical roller mill by Gebr. Pfeiffer, Kaiserslaughtern, Germany. Plaster of Paris was added for sulfate balance to provide 2.3% SO$_3$. The Class F fly ash was a standard fly ash obtained from Headwaters. The calcined shale was flue dust obtained from Utelite, Coalville, Utah. The quarry fines containing at least about 90% limestone in the form of calcite were purchased from Staker-Parson. The coarse aggregate and fine aggregate were purchased from Staker-Parson. The ultrafine fly ash (UFFA) was made by classifying a waste fly ash designated for landfill either from Huntington, Utah or Hunter, Utah power plant. The concrete mixes were based on a common "6-bag" concrete mix with a design strength at 28 days of 5200 psi. The concrete mixes are expressed in terms of the quantities required to make a cubic yard of concrete and are set forth in Table 2.

TABLE 2

| Components/ Compressive Strength | Example | | | | | |
|---|---|---|---|---|---|---|
| | 12 | 13 | 14 | 15 | 16 | 17 |
| Type I/II OPC (lb.) | 366.6 | 0 | 0 | 423 | 394.8 | 394.8 |
| Interground cement (lb.) | 0 | 540.85 | 721.13 | 0 | 0 | 0 |
| Class F Fly Ash (lb.) | 0 | 0 | 0 | 112.8 | 112.8 | 112.8 |
| Calcined Shale (lb.) | 50.8 | 0 | 0 | 0 | 0 | 0 |
| UFFA (lb.) | 141 | 0 | 0 | 0 | 0 | 0 |
| Coarse F ash (lb.) | 0 | 0 | 0 | 0 | 0 | 0 |
| Quarry Fines (lb.) | 56.4 | 112.8 | 112.8 | 84.6 | 112.8 | 107.2 |
| Plaster of Paris (lb.) | 0 | 23.4 | 30.87 | 0 | 0 | 0 |
| Type S Lime (lb.) | 5.64 | 11.28 | 11.28 | 5.64 | 0 | 5.64 |
| Coarse Aggregate (lb.) | 1687 | 1704 | 1600 | 1700 | 1720 | 1720 |
| Fine Aggregate (lb.) | 1300 | 1205 | 1175 | 1260 | 1260 | 1260 |
| Water (lb.) | 248.2 | 270.38 | 251.88 | 256.3 | 248.2 | 248.2 |
| w/cm | 0.44 | 0.47 | 0.33 | 0.45 | 0.44 | 0.44 |
| w/c | 0.68 | 0.94 | 0.66 | 0.61 | 0.63 | 0.63 |
| 3-day (psi) | 3280 | 3590 | 2390 | 3690 | 4320 | 4520 |
| 7-day (psi) | 5000 | 4620 | 4970 | 4450 | 5450 | 5900 |
| 28-day (psi) | 7600 | 5830 | 6970 | 5380 | 6830 | 7280 |
| 3-month (psi) | 8530 | 6750 | 9000 | 6660 | 8530 | 9390 |

As shown in Table 2, the concrete made using UFFA exhibited superior strength at 28 days. The concrete made with fine interground cement-pozzolan and quarry fines exhibited impressive strength given the low clinker content and relatively high water used in Example 13. Example 14 made at much lower water was retarded using citric acid (0.2% by weight of interground cement), which reduced early strength but might ultimately yield very high strength when the results come in. Blends made using regular fly ash and quarry fines showed good early strength. The use of hydrated lime in Example 17 boosted early and late strengths compared to Example 16 of almost the same mix.

Examples 18-19

Concrete mixes were made as above. The Portland cement was a Type I/II OPC manufactured by Holcim, Devil's Slide, Utah plant. The ultrafine fly ash (UFFA) was made by classifying a fly ash from either Huntington, Utah or Jim Bridger, Wyo. power plants. The Class F fly ash was a standard fly ash obtained from Headwaters. The quarry fines containing at least about 90% limestone in the form of calcite were purchased from Staker-Parson. The coarse aggregate and fine aggregate were purchased from Staker-Parson. The ultrafine fly ash (UFFA) was made by classifying fly ash from Jim Bridger, Wyo. power plant. The concrete mixes are expressed in terms of the quantities required to make a cubic yard of concrete and are set forth in Table 3.

TABLE 3

| Components/Compressive Strength | Example | |
|---|---|---|
| | 18 | 19 |
| Type I/II OPC (lb.) | 317.3 | 317.3 |
| Class F Fly Ash (lb.) | 105.8 | 105.8 |
| UPPA (lb.) | 105.8 | 105.8 |
| Coarse F ash (lb.) | 268 | 162.2 |
| Quarry Fines (lb.) | 0 | 105.8 |
| Type S Lime (lb.) | 14.10 | 14.10 |
| Coarse Aggregate (lb.) | 1600 | 1600 |
| Fine Aggregate (lb.) | 1263 | 1263 |
| Water (lb.) | 211.5 | 211.5 |
| w/cm | 0.30 | 0.30 |
| w/c | 0.67 | 0.67 |
| 3-day (psi) | 2950 | 4030 |
| 7-day (psi) | 3790 | 5690 |
| 28-day (psi) | 6170 | 9210 |
| 3-month (psi) | 7110 | 10,280 |

As shown by comparing Examples 18 and 19, the use of quarry fines in place of some of the coarse fly ash greatly improved both early and late strengths.

Examples 20-44

Mortar mixes were made according to ASTM C109, but modified to include less water and more cement, using a Hobart mixer. Fresh mortar was cast into 2×2 inch cubes and tested by CMT Engineering in West Valley City, Utah. The Portland cement was a Type I/II OPC manufactured by Holcim, Devil's Slide, Utah plant. The ultrafine fly ash (UFFA) was made by classifying a fly ash from Huntington, Utah, Hunter, Utah, or Jim Bridger, Wyo. power plants. The silica fume was condensed silica fume provided by Calmetrix. The calcined shale was flue dust obtained from Utelite, Coalville, Utah. The Class F fly ash was a standard fly ash obtained from Headwaters from a power plant in Alabama. The quarry fines containing at least about 90% limestone in the form of calcite were purchased from Staker-Parson and produced in Genola, Utah at a limestone quarry. The sand was a standard silica sand. The mortar mixes are expressed in terms of the quantities required to make approximately 9 cubes and are set forth in Tables 5-10. Suitable lignosulfonate (Plastocrete 161) and/or polycarboxylate ether (Viscocrete 2100) were used in some cases to maintain flow between 100-120 on a flow table.

TABLE 4

| Components/ Compressive Strength | Example | | | | | |
|---|---|---|---|---|---|---|
| | 20 | 21 | 22 | 23 | 24 | 25 |
| Type I/II OPC (g) | 920 | 782 | 782 | 782 | 782 | 782 |
| Class F Fly Ash (g) | 0 | 138 | 0 | 0 | 0 | 0 |
| Silica Fume (g) | 0 | 0 | 138 | 0 | 0 | 0 |

TABLE 4-continued

| Components/Compressive Strength | Example | | | | | |
|---|---|---|---|---|---|---|
| | 20 | 21 | 22 | 23 | 24 | 25 |
| Bridger UFFA (g) | 0 | 0 | 0 | 138 | 0 | 0 |
| Hunter UFFA (g) | 0 | 0 | 0 | 0 | 138 | 0 |
| Huntington UFFA (g) | 0 | 0 | 0 | 0 | 0 | 138 |
| Silica Sand (g) | 1925 | 1883 | 1883 | 1883 | 1880 | 1851 |
| Water (g) | 322 | 322 | 322 | 322 | 322 | 322 |
| w/cm | 0.35 | 0.35 | 0.35 | 0.35 | 0.35 | 0.35 |
| 3-day (psi) | 8358 | 7135 | 7560 | 6630 | 6327 | 8045 |
| 7-day (psi) | 8770 | 8300 | 9687 | 8167 | 7690 | 8827 |
| 28-day (psi) | 11425 | 8895 | 12337 | 9192 | 8677 | 12920 |

TABLE 5

| Components/Compressive Strength | Example | | | | | |
|---|---|---|---|---|---|---|
| | 26 | 27 | 28 | 29 | 30 | 31 |
| Type I/II OPC (g) | 782 | 782 | 782 | 782 | 782 | 782 |
| Bridger UFFA (g) | 138 | 138 | 138 | 138 | 0 | 0 |
| Headwaters UFFA (g) | 0 | 0 | 0 | 0 | 138 | 0 |
| Headwaters FFA (g) | 0 | 0 | 0 | 0 | 0 | 138 |
| Quarry Fines (g) | 0 | 0 | 138 | 138 | 138 | 138 |
| Quicklime (g) | 13.92 | 0 | 0 | 0 | 0 | 0 |
| Type S Lime (g) | 0 | 18.4 | 0 | 0 | 0 | 0 |
| Silica Sand (g) | 1851 | 1851 | 1622 | 1747 | 1747 | 1747 |
| Water (g) | 332.92 | 328.44 | 322 | 322 | 322 | 322 |
| w/cm | 0.35 | 0.35 | 0.35 | 0.35 | 0.35 | 0.35 |
| 3-day (psi) | 7202 | 7785 | 8067 | 8442 | 7712 | 6760 |
| 7-day (psi) | 8595 | 8165 | 9000 | 10075 | 9362 | 8375 |
| 28-day (psi) | 11035 | 10755 | 11387 | 10960 | 11477 | 10542 |

TABLE 6

| Components/Compressive Strength | Example | | | | | |
|---|---|---|---|---|---|---|
| | 32 | 33 | 34 | 35 | 36 | 37 |
| Type I/II OPC (g) | 782 | 782 | 782 | 782 | 782 | 782 |
| Bridger UFFA (g) | 138 | 0 | 0 | 0 | 0 | 0 |
| Hunter UFFA (g) | 0 | 0 | 0 | 0 | 0 | 0 |
| Huntington UFFA (g) | 0 | 138 | 138 | 138 | 0 | 138 |
| Calcined Shale (g) | 0 | 0 | 0 | 0 | 138 | 138 |
| Quarry Fines (g) | 138 | 0 | 138 | 138 | 0 | 0 |
| Type S Lime (g) | 9.2 | 18.4 | 0 | 18.4 | 18.4 | 0 |
| Silica Sand (g) | 1722 | 1851 | 1747 | 1722 | 1851 | 1883 |
| Water (g) | 325.22 | 322 | 322 | 322 | 322 | 322 |
| w/cm | 0.35 | 0.35 | 0.35 | 0.35 | 0.35 | 0.35 |
| 3-day (psi) | 7935 | 8225 | 8212 | 7445 | 7145 | 4507 |
| 7-day (psi) | 10225 | 9570 | 8890 | 9080 | 8205 | 8235 |
| 28-day (psi) | 11750 | 10050 | 11295 | 11297 | 10247 | 10000 |

TABLE 7

| Components/Compressive Strength | Example | | | | | |
|---|---|---|---|---|---|---|
| | 38 | 39 | 40 | 41 | 42 | 43 |
| Type I/II OPC (g) | 644 | 644 | 644 | 782 | 782 | 782 |
| Bridger UFFA (g) | 138 | 138 | 138 | 138 | 0 | 138 |
| Hunter UFFA (g) | 0 | 0 | 0 | 0 | 0 | 0 |
| Huntington UFFA (g) | 0 | 0 | 0 | 0 | 0 | 0 |
| Calcined Shale (g) | 138 | 138 | 138 | 0 | 138 | 0 |
| Quarry Fines (g) | 0 | 138 | 138 | 138 | 138 | 138 |
| Type S Lime (g) | 0 | 0 | 18.4 | 0 | 0 | 9.2 |
| Silica Sand (g) | 1841 | 1698 | 1678 | 1764 | 1764 | 1732 |
| Water (g) | 322 | 322 | 322 | 322 | 322 | 325.22 |
| w/cm | 0.35 | 0.35 | 0.35 | 0.35 | 0.35 | 0.35 |
| 3-day (psi) | 6020 | 6175 | 6670 | 8647 | 6877 | 8882 |
| 7-day (psi) | 7390 | 6922 | 7575 | 9695 | 8735 | 9535 |
| 28-day (psi) | 9120 | 8985 | 9985 | 11492 | 10455 | 10925 |

TABLE 8

| Components/Compressive Strength | Example | |
|---|---|---|
| | 44 | 45 |
| Type I/II OPC (g) | 782 | 644 |
| Huntington UFFA (g) | 138 | 0 |
| UF Steel Slag (g) | 0 | 138 |
| Quarry Fines (g) | 138 | 138 |
| Type S Lime (g) | 9.2 | 9.2 |
| Silica Sand (g) | 1732 | 1776 |
| Water (g) | 325.22 | 325.22 |
| w/cm | 0.35 | 0.35 |
| 3-day (psi) | 8605 | 8475 |
| 7-day (psi) | 9755 | 9742 |
| 28-day (psi) | 11990 | 11415 |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of converting a non-conforming fly ash into conforming fly ash, comprising:
    obtaining an initial fly ash with at least one non-conforming characteristic selected from excess carbon or low reactivity index as defined by ASTM C-618 and having a D10, D50 and D90;
    classifying the initial fly ash using one or more air classifiers to produce at least two separate fly ash streams, including fine fly ash and coarse fly ash;
    collecting the fine fly ash and the coarse fly ash, the fine fly ash having a D90 approximately equal to or less than the D50 of the initial fly ash and a conforming carbon content and a conforming reactivity index as defined by ASTM C-618; and blending the fine fly ash with an aluminosilicate source to form a modified fine fly ash.

2. The method of claim 1, the initial fly ash having a reactivity index as defined by ASTM C-618 of less than 75.

3. The method of claim 1, the initial fly ash having a carbon content greater than 5.5%.

4. The method of claim 1, the initial fly ash having a D90 greater than 80 μm.

5. The method of claim 1, the initial fly ash having a D50 in a range of 12 μm to 40 μm.

6. The method of claim 1, the initial fly ash having a D10 less than 8 μm.

7. The method of claim 1, the fine fly ash having a D90 less than 25 μm.

8. The method of claim 1, the fine fly ash having a reactivity index as defined by ASTM C-618 of at least 95.

9. The method of claim 1, the fine fly ash having a carbon content of less than 5%.

10. The method of claim 1, further comprising blending the fine fly ash or the modified fine fly ash with hydraulic cement to form a dry cementitious binder blend.

11. The method of claim 10, further comprising adding a sulfate source to compensate for sulfate deficiency caused by the fine fly ash.

12. The method of claim 1, further comprising blending the fine fly ash or the modified fine fly ash with hydraulic cement and water to form a cementitious mixture.

13. The method of claim 12, further comprising adding a sulfate source to compensate for sulfate deficiency caused by the fine fly ash or the modified fine fly ash.

14. The method of claim 13, further comprising adding supplemental lime.

15. The method of claim 1, wherein blending the fine fly ash with an aluminosilicate source increases the SAF (total combined silica, alumina, and ferric oxide) of the modified fine fly ash compared to the fine fly ash.

16. The method of claim 15, wherein the SAF of the fine fly ash is less than 70% and the SAF of the modified fine fly ash is at least 70%.

17. A method of converting a non-conforming fly ash into a conforming fly ash blend, comprising:

obtaining an initial fly ash with at least one non-conforming characteristic selected from excess carbon or low reactivity index as defined by ASTM C-618 and having a D10, D50 and D90;

classifying the initial fly ash using one or more air classifiers to produce at least two separate fly ash streams, including fine fly ash and coarse fly ash;

collecting the fine fly ash and the coarse fly ash, the fine fly ash having a D90 less than the D90 of the initial fly ash;

blending the fine fly ash with an aluminosilicate source comprised of a natural pozzolan to form a fly ash blend having a conforming carbon content and a conforming reactivity index as defined by ASTM C-618.

18. The method of claim 17, the initial fly ash having a reactivity index as defined by ASTM C-618 of less than 75, the fly ash blend having a reactivity index of at least 75.

19. A method of converting a non-conforming fly ash into conforming fly ash blend, comprising:

obtaining an initial fly ash with at least one non-conforming characteristic selected from excess carbon, low reactivity index as defined by ASTM C-618, or low SAF (total combined silica, alumina, and ferric oxide) as defined by ASTM C-618;

classifying the initial fly ash using one or more air classifiers to produce at least two separate fly ash streams, including fine fly ash and coarse fly ash;

collecting the fine fly ash and the coarse fly ash, the fine fly ash having a D90 less than the D90 of the initial fly ash;

blending the fine fly ash with an aluminosilicate source comprised of a natural pozzolan to form a fly ash blend having a conforming carbon content, a conforming reactivity index as defined by ASTM C-618, and a conforming SAF as defined by ASTM C-618 for Class F fly ash.

20. The method of claim 19, wherein the SAF of the initial fly ash is less than 70% and the SAF of the fly ash blend is at least 70%.

* * * * *